(12) United States Patent
Matthews, III et al.

(10) Patent No.: US 10,249,119 B2
(45) Date of Patent: *Apr. 2, 2019

(54) HUB KEY SERVICE

(71) Applicant: Microsoft Technology Licensing, LLC, Redmond, WA (US)

(72) Inventors: Joseph H. Matthews, III, Woodinville, WA (US); Lavanya Vasudevan, Sammamish, WA (US); Shawn M. Thomas, Redmond, WA (US); Joseph A. Schrader, Kirkland, WA (US); Ted Tai-Yu Chen, Seattle, WA (US); Raman K. Sarin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/216,552

(22) Filed: Jul. 21, 2016

(65) Prior Publication Data
US 2016/0328902 A1 Nov. 10, 2016

Related U.S. Application Data

(63) Continuation of application No. 13/726,043, filed on Dec. 22, 2012, now Pat. No. 9,710,982.
(Continued)

(51) Int. Cl.
*G06F 21/00* (2013.01)
*G07C 9/00* (2006.01)
(Continued)

(52) U.S. Cl.
CPC ....... *G07C 9/00309* (2013.01); *G06F 3/0484* (2013.01); *H04L 63/08* (2013.01);
(Continued)

(58) Field of Classification Search
CPC ..... G07C 9/00309; G07C 2009/00769; H04W 4/21; H04W 12/08; H04W 12/06; G06F 3/0484; G06F 3/0481; H04L 63/08
See application file for complete search history.

(56) References Cited

U.S. PATENT DOCUMENTS 5,379,451 A 1/1995 Nakagoshi et al.
5,883,598 A 3/1999 Parl et al.
(Continued)

FOREIGN PATENT DOCUMENTS

CN 1677303 A 10/2005
CN 1984402 A 6/2007
(Continued)

OTHER PUBLICATIONS

Amin et al., "Fancy a Drink in Canary Wharf?: A User Study on Location-Based Mobile Search", Proceedings of the 12th IFIP TC 13 International Conference on Human-Computer Interaction: Part 1, Aug. 24, 2009, pp. 736-749, 14 pages.
(Continued)

*Primary Examiner* — Kendall Dolly
(74) *Attorney, Agent, or Firm* — Rainier Patents, P.S.

(57) ABSTRACT

In embodiments of a hub key service, a device includes a communication interface for communication coordination with one or more associated devices of the device, and the associated devices correspond to hub members. A hub manager is implemented to generate an electronic key that includes access permissions, which are configurable to enable controlled access for the hub members, such as to a building, vehicle, media device, or location. The hub manager can then correlate the electronic key with the device to enable access to the building, vehicle, media device, or location with the device utilized as the electronic key.

20 Claims, 10 Drawing Sheets

Related U.S. Application Data

(60) Provisional application No. 61/580,143, filed on Dec. 23, 2011.

(51) Int. Cl.
  H04L 29/06 (2006.01)
  H04W 12/06 (2009.01)
  H04W 12/08 (2009.01)
  G06F 3/0484 (2013.01)
  H04W 4/21 (2018.01)
  G06F 3/0481 (2013.01)

(52) U.S. Cl.
  CPC ............. *H04W 4/21* (2018.02); *H04W 12/06* (2013.01); *H04W 12/08* (2013.01); *G06F 3/0481* (2013.01); *G07C 2009/00769* (2013.01)

(56) References Cited

U.S. PATENT DOCUMENTS

| | | | |
|---|---|---|---|
| 6,078,826 A | 6/2000 | Croft et al. | |
| 6,243,595 B1 | 6/2001 | Lee et al. | |
| 6,286,001 B1 | 9/2001 | Walker et al. | |
| 6,339,826 B2 | 1/2002 | Hayes et al. | |
| 6,405,033 B1 | 6/2002 | Kennedy et al. | |
| 6,446,069 B1 | 9/2002 | Yaung et al. | |
| 6,504,480 B1 | 1/2003 | Magnuson et al. | |
| 6,519,530 B2 | 2/2003 | Crockett | |
| 6,546,002 B1 | 4/2003 | Kim | |
| 6,549,768 B1 | 4/2003 | Fraccaroli | |
| 6,564,149 B2 | 5/2003 | Lai | |
| 6,650,189 B1 | 11/2003 | Romao | |
| 6,662,023 B1 | 12/2003 | Helle | |
| 6,678,508 B1 | 1/2004 | Koilpillai et al. | |
| 6,799,047 B1 | 9/2004 | Bahl et al. | |
| 6,847,892 B2 | 1/2005 | Zhou | |
| 6,920,455 B1 | 7/2005 | Weschler | |
| 6,941,134 B2 | 9/2005 | White | |
| 6,990,353 B2 | 1/2006 | Florkey et al. | |
| 7,058,659 B2 | 6/2006 | Ryu | |
| 7,076,797 B2 | 7/2006 | Loveland | |
| 7,096,030 B2 | 8/2006 | Huomo | |
| 7,142,848 B2 | 11/2006 | Owen et al. | |
| 7,161,914 B2 | 1/2007 | Shoaib et al. | |
| 7,171,557 B2 | 1/2007 | Kallahalla et al. | |
| 7,200,394 B2 | 4/2007 | Aoki et al. | |
| 7,212,613 B2 | 5/2007 | Kim et al. | |
| 7,222,360 B1 | 5/2007 | Miller | |
| 7,272,388 B2 | 9/2007 | Andrew et al. | |
| 7,274,925 B2 | 9/2007 | Chaar et al. | |
| 7,302,272 B2 | 11/2007 | Ackley | |
| 7,305,284 B2 | 12/2007 | Teshima et al. | |
| 7,308,255 B2 | 12/2007 | Loveland | |
| 7,321,774 B1 | 1/2008 | Lau et al. | |
| 7,346,921 B2 | 3/2008 | Murren et al. | |
| 7,353,234 B2 | 4/2008 | Kimball et al. | |
| 7,359,713 B1 | 4/2008 | Tiwari | |
| 7,366,795 B2 | 4/2008 | O'Neil | |
| 7,366,798 B2 | 4/2008 | Nordstrom et al. | |
| 7,397,908 B2 | 7/2008 | Jassen | |
| 7,408,506 B2 | 8/2008 | Miller | |
| 7,471,929 B2 | 12/2008 | Fujioka et al. | |
| 7,530,099 B2 | 5/2009 | Flurry et al. | |
| 7,548,757 B2 | 6/2009 | Major | |
| 7,565,157 B1 | 7/2009 | Ortega et al. | |
| 7,629,891 B1 | 12/2009 | Bell | |
| 7,634,455 B1 | 12/2009 | Keene et al. | |
| 7,657,849 B2 | 2/2010 | Chaudhri et al. | |
| 7,668,830 B2 | 2/2010 | Hakala | |
| 7,680,882 B2 | 3/2010 | Tiu, Jr. et al. | |
| 7,714,778 B2 | 5/2010 | Dupray | |
| 7,796,944 B2 | 9/2010 | Eaton et al. | |
| 7,809,350 B2 | 10/2010 | Buckley et al. | |
| 7,869,792 B1 | 1/2011 | Zhou et al. | |
| 7,898,428 B2 | 3/2011 | Dietz et al. | |
| 7,958,562 B2 | 6/2011 | Gaucas | |
| 7,961,651 B2 | 6/2011 | Kim et al. | |
| 7,962,156 B2 | 6/2011 | Robertson et al. | |
| 7,987,378 B2 | 7/2011 | Lee et al. | |
| 8,024,112 B2 | 9/2011 | Krumm et al. | |
| 8,046,839 B2 | 10/2011 | Lo | |
| 8,228,234 B2 | 7/2012 | Paulson et al. | |
| 8,244,272 B2 | 8/2012 | Morgan et al. | |
| 8,275,352 B2 | 9/2012 | Forstall et al. | |
| 8,311,730 B2 | 11/2012 | Neff | |
| 8,331,899 B2 | 12/2012 | Broms | |
| 8,355,751 B2 | 1/2013 | Dietz et al. | |
| 8,385,039 B2 | 2/2013 | Rothkopf | |
| 8,433,334 B2 | 4/2013 | Haung et al. | |
| 8,437,779 B2 | 5/2013 | Phukan | |
| 8,477,139 B2 | 7/2013 | Robinet et al. | |
| 8,549,657 B2 | 10/2013 | Karlson et al. | |
| 8,565,820 B2 | 10/2013 | Riemer et al. | |
| 8,639,803 B2 | 1/2014 | Mortiz et al. | |
| 8,657,743 B2 | 2/2014 | Rietzel et al. | |
| 8,660,531 B2 | 2/2014 | Hymel | |
| 8,706,172 B2 | 4/2014 | Priyantha et al. | |
| 8,732,822 B2 | 5/2014 | Schechter et al. | |
| 8,826,013 B1 * | 9/2014 | Kodukula | G06F 21/53 380/279 |
| 8,874,162 B2 | 10/2014 | Schrader et al. | |
| 8,907,772 B1 | 12/2014 | Green et al. | |
| 8,918,119 B2 | 12/2014 | Kim et al. | |
| 9,019,077 B2 | 4/2015 | Hazzani | |
| 9,027,117 B2 | 5/2015 | Wilairat | |
| 9,066,234 B2 | 6/2015 | Karlson et al. | |
| 9,230,076 B2 | 1/2016 | King et al. | |
| 9,420,432 B2 | 8/2016 | Matthews et al. | |
| 9,467,834 B2 | 10/2016 | Guday et al. | |
| 9,491,589 B2 | 11/2016 | Schrader et al. | |
| 2001/0005681 A1 | 6/2001 | Kim | |
| 2001/0039587 A1 | 11/2001 | Uhler et al. | |
| 2002/0026478 A1 | 2/2002 | Rodgers | |
| 2002/0044149 A1 | 4/2002 | McCarthy et al. | |
| 2002/0160764 A1 | 10/2002 | Gorsuch | |
| 2003/0003907 A1 | 1/2003 | Lai et al. | |
| 2003/0139192 A1 | 7/2003 | Chmaytelli et al. | |
| 2003/0187803 A1 | 10/2003 | Pitt | |
| 2004/0007916 A1 | 1/2004 | Awada et al. | |
| 2004/0015940 A1 | 1/2004 | Heisey et al. | |
| 2004/0039909 A1 | 2/2004 | Cheng | |
| 2004/0166878 A1 | 8/2004 | Erskine et al. | |
| 2004/0192352 A1 | 9/2004 | Vallstrom et al. | |
| 2004/0203576 A1 | 10/2004 | Droste et al. | |
| 2004/0243812 A1 * | 12/2004 | Yui | G07C 1/10 713/182 |
| 2005/0012640 A1 | 1/2005 | Kong et al. | |
| 2005/0037775 A1 | 2/2005 | Moeglein et al. | |
| 2005/0055567 A1 * | 3/2005 | Libin | G07C 9/00103 726/26 |
| 2005/0059418 A1 | 3/2005 | Northcutt | |
| 2005/0070276 A1 | 3/2005 | McGarry | |
| 2005/0107114 A1 | 5/2005 | Ocock et al. | |
| 2005/0138110 A1 | 6/2005 | Redlich et al. | |
| 2005/0143171 A1 | 6/2005 | Loose | |
| 2005/0210104 A1 | 9/2005 | Torvinen | |
| 2005/0222768 A1 | 10/2005 | Tauchi et al. | |
| 2006/0046706 A1 | 3/2006 | Lin et al. | |
| 2006/0053389 A1 | 3/2006 | Michelman | |
| 2006/0099969 A1 | 5/2006 | Staton et al. | |
| 2006/0136962 A1 | 6/2006 | Masaki | |
| 2006/0136998 A1 | 6/2006 | Oowaki et al. | |
| 2006/0246872 A1 | 11/2006 | Tarkkala | |
| 2006/0253570 A1 | 11/2006 | Biswas et al. | |
| 2006/0256005 A1 | 11/2006 | Thandu et al. | |
| 2006/0271797 A1 | 11/2006 | Ginggen et al. | |
| 2006/0293057 A1 | 12/2006 | Mazerski et al. | |
| 2007/0006327 A1 | 1/2007 | Lal et al. | |
| 2007/0028176 A1 | 2/2007 | Perdomo et al. | |
| 2007/0032225 A1 | 2/2007 | Konicek et al. | |
| 2007/0042790 A1 | 2/2007 | Mohi et al. | |
| 2007/0046423 A1 | 3/2007 | Baucom | |
| 2007/0046456 A1 | 3/2007 | Edwards et al. | |

(56) References Cited

U.S. PATENT DOCUMENTS

| | | |
|---|---|---|
| 2007/0064882 A1 | 3/2007 | Ger et al. |
| 2007/0067655 A1 | 3/2007 | Shuster |
| 2007/0072616 A1 | 3/2007 | Irani |
| 2007/0073832 A1 | 3/2007 | Curtis et al. |
| 2007/0082707 A1 | 4/2007 | Flynt et al. |
| 2007/0091037 A1 | 4/2007 | Lee |
| 2007/0111726 A1 | 5/2007 | Lambert et al. |
| 2007/0120948 A1 | 5/2007 | Fujioka et al. |
| 2007/0150826 A1 | 6/2007 | Anzures et al. |
| 2007/0150842 A1 | 6/2007 | Chaudhri et al. |
| 2007/0168971 A1 | 7/2007 | Royzen |
| 2007/0180509 A1 | 8/2007 | Swartz et al. |
| 2007/0218938 A1 | 9/2007 | Carter |
| 2007/0245398 A1 | 10/2007 | Roden |
| 2007/0264981 A1 | 11/2007 | Miller |
| 2007/0275767 A1 | 11/2007 | Steele |
| 2007/0300140 A1 | 12/2007 | Makela et al. |
| 2008/0014964 A1 | 1/2008 | Sudit et al. |
| 2008/0020803 A1 | 1/2008 | Rios et al. |
| 2008/0032703 A1 | 2/2008 | Krumm et al. |
| 2008/0051079 A1 | 2/2008 | Forsgren |
| 2008/0070593 A1 | 3/2008 | Altman et al. |
| 2008/0080688 A1 | 4/2008 | Burgan et al. |
| 2008/0082693 A1 | 4/2008 | Meijer et al. |
| 2008/0096518 A1 | 4/2008 | Mock et al. |
| 2008/0096519 A1 | 4/2008 | Miegel |
| 2008/0101658 A1 | 5/2008 | Ahem et al. |
| 2008/0104225 A1 | 5/2008 | Zhang et al. |
| 2008/0111698 A1 | 5/2008 | Atherton |
| 2008/0140650 A1 | 6/2008 | Stackpole |
| 2008/0154780 A1 | 6/2008 | Soukup et al. |
| 2008/0184127 A1 | 7/2008 | Rafey et al. |
| 2008/0254767 A1 | 10/2008 | Jin |
| 2008/0256170 A1 | 10/2008 | Hayashi et al. |
| 2008/0267381 A1 | 10/2008 | Janssen |
| 2008/0268870 A1 | 10/2008 | Houri |
| 2008/0305808 A1 | 12/2008 | Chan et al. |
| 2008/0311947 A1 | 12/2008 | Soerensen et al. |
| 2008/0318595 A1 | 12/2008 | Rofougaran |
| 2009/0005061 A1 | 1/2009 | Ward et al. |
| 2009/0005080 A1 | 1/2009 | Forstall et al. |
| 2009/0006566 A1 | 1/2009 | Veeramachaneni et al. |
| 2009/0006991 A1 | 1/2009 | Lindberg et al. |
| 2009/0045927 A1 | 2/2009 | Atella |
| 2009/0089886 A1 | 4/2009 | Cheng et al. |
| 2009/0093688 A1 | 4/2009 | Mathur |
| 2009/0116703 A1 | 5/2009 | Schultz |
| 2009/0119590 A1 | 5/2009 | Kondziela et al. |
| 2009/0143082 A1 | 6/2009 | Begeja et al. |
| 2009/0157560 A1 | 6/2009 | Carter et al. |
| 2009/0158389 A1 | 6/2009 | Waltenberg et al. |
| 2009/0170532 A1 | 7/2009 | Lee et al. |
| 2009/0197617 A1 | 8/2009 | Jayanthi |
| 2009/0201896 A1 | 8/2009 | Davis et al. |
| 2009/0205041 A1 | 8/2009 | Michalske |
| 2009/0224931 A1 | 9/2009 | Dietz et al. |
| 2009/0265794 A1 | 10/2009 | Apelqvist |
| 2009/0270034 A1 | 10/2009 | Suzuki |
| 2009/0278738 A1 | 11/2009 | Gopinath |
| 2009/0282473 A1 | 11/2009 | Karlson et al. |
| 2009/0298475 A1 | 12/2009 | Czaja et al. |
| 2010/0001967 A1 | 1/2010 | Yoo |
| 2010/0004005 A1 | 1/2010 | Pereira et al. |
| 2010/0010733 A1 | 1/2010 | Krumm |
| 2010/0020035 A1 | 1/2010 | Ryu et al. |
| 2010/0045519 A1 | 2/2010 | Lee |
| 2010/0056124 A1 | 3/2010 | Keating et al. |
| 2010/0066821 A1 | 3/2010 | Rosener et al. |
| 2010/0069007 A1 | 3/2010 | Nagasawa |
| 2010/0070334 A1 | 3/2010 | Monteverde |
| 2010/0074450 A1 | 3/2010 | Liao |
| 2010/0082247 A1 | 4/2010 | Klein et al. |
| 2010/0115610 A1 | 5/2010 | Tredoux et al. |
| 2010/0127836 A1 | 5/2010 | Huang et al. |
| 2010/0134310 A1 | 6/2010 | Zheng et al. |
| 2010/0162180 A1 | 6/2010 | Dunnam et al. |
| 2010/0162182 A1 | 6/2010 | Oh et al. |
| 2010/0167714 A1 | 7/2010 | Howarter et al. |
| 2010/0190479 A1 | 7/2010 | Scott et al. |
| 2010/0210301 A1 | 8/2010 | Dietz et al. |
| 2010/0216509 A1 | 8/2010 | Riemer et al. |
| 2010/0217646 A1 | 8/2010 | Siegel |
| 2010/0227588 A1 | 9/2010 | Bradley |
| 2010/0231383 A1 | 9/2010 | Levine et al. |
| 2010/0235881 A1 | 9/2010 | Liu et al. |
| 2010/0253503 A1 | 10/2010 | Juang |
| 2010/0255856 A1 | 10/2010 | Kansal et al. |
| 2010/0268779 A1 | 10/2010 | Rao |
| 2010/0271651 A1 | 10/2010 | Kimura |
| 2010/0285815 A1 | 11/2010 | Treu et al. |
| 2010/0302028 A1 | 12/2010 | Desai et al. |
| 2010/0306705 A1 | 12/2010 | Nilsson |
| 2010/0306832 A1 | 12/2010 | Mu et al. |
| 2010/0311336 A1 | 12/2010 | Huotari et al. |
| 2010/0313050 A1 | 12/2010 | Harrat et al. |
| 2010/0321155 A1 | 12/2010 | Ballard |
| 2010/0323715 A1 | 12/2010 | Winters |
| 2010/0324819 A1 | 12/2010 | Nurminen et al. |
| 2011/0010340 A1 | 1/2011 | Hung et al. |
| 2011/0021213 A1 | 1/2011 | Carr |
| 2011/0021234 A1 | 1/2011 | Tibbitts et al. |
| 2011/0047484 A1 | 2/2011 | Mount et al. |
| 2011/0063098 A1 | 3/2011 | Fischer et al. |
| 2011/0065419 A1 | 3/2011 | Book et al. |
| 2011/0070829 A1 | 3/2011 | Griffin et al. |
| 2011/0088086 A1 | 4/2011 | Swink et al. |
| 2011/0093161 A1 | 4/2011 | Zhou et al. |
| 2011/0099486 A1 | 4/2011 | Nesladek et al. |
| 2011/0111728 A1 | 5/2011 | Ferguson et al. |
| 2011/0151839 A1 | 6/2011 | Bolon et al. |
| 2011/0167342 A1 | 7/2011 | De La Pena et al. |
| 2011/0167344 A1 | 7/2011 | Pan |
| 2011/0169654 A1 | 7/2011 | Ketari |
| 2011/0171958 A1 | 7/2011 | Hua et al. |
| 2011/0197160 A1 | 8/2011 | Kim et al. |
| 2011/0208430 A1 | 8/2011 | Tun et al. |
| 2011/0215903 A1 | 9/2011 | Yang et al. |
| 2011/0215952 A1 | 9/2011 | Aria et al. |
| 2011/0237221 A1 | 9/2011 | Prakash et al. |
| 2011/0241827 A1 | 10/2011 | Varoglu |
| 2011/0244837 A1 | 10/2011 | Murata et al. |
| 2011/0247045 A1 | 10/2011 | Rajagopal et al. |
| 2011/0250840 A1 | 10/2011 | Lee et al. |
| 2011/0254792 A1 | 10/2011 | Waters et al. |
| 2011/0264246 A1 | 10/2011 | Pantoja et al. |
| 2011/0267171 A1 | 11/2011 | Li et al. |
| 2011/0275321 A1 | 11/2011 | Zhou et al. |
| 2011/0276901 A1 | 11/2011 | Zambetti |
| 2011/0283185 A1 | 11/2011 | Obasanjo et al. |
| 2011/0283241 A1 | 11/2011 | Miller et al. |
| 2011/0283311 A1 | 11/2011 | Luong |
| 2011/0285271 A1 | 11/2011 | Krumm et al. |
| 2011/0299422 A1 | 12/2011 | Kim et al. |
| 2011/0307166 A1 | 12/2011 | Hiestermann et al. |
| 2011/0317162 A1 | 12/2011 | DeFreez et al. |
| 2011/0319051 A1 | 12/2011 | Reitnour |
| 2011/0319094 A1 | 12/2011 | Usui et al. |
| 2012/0009896 A1 | 1/2012 | Bandyopadhyay et al. |
| 2012/0023573 A1 | 1/2012 | Jianxiong |
| 2012/0046020 A1 | 2/2012 | Tomasini |
| 2012/0084691 A1 | 4/2012 | Yun |
| 2012/0084734 A1 | 4/2012 | Wilairat |
| 2012/0084737 A1 | 4/2012 | Gimpl et al. |
| 2012/0089217 A1 | 4/2012 | Mews et al. |
| 2012/0098768 A1 | 4/2012 | Bendewald et al. |
| 2012/0100895 A1 | 4/2012 | Priyantha et al. |
| 2012/0108166 A1 | 5/2012 | Hymel |
| 2012/0115512 A1 | 5/2012 | Grainger et al. |
| 2012/0144468 A1 | 6/2012 | Pratt et al. |
| 2012/0146850 A1 | 6/2012 | Liu et al. |
| 2012/0158289 A1 | 6/2012 | Brush et al. |
| 2012/0166452 A1 | 6/2012 | Tseng |
| 2012/0166548 A1 | 6/2012 | Gropper |
| 2012/0234058 A1 | 9/2012 | Neil et al. |

(56) References Cited

U.S. PATENT DOCUMENTS

| | | |
|---|---|---|
| 2012/0242906 A1 | 9/2012 | Shintani et al. |
| 2012/0244883 A1 | 9/2012 | Tibbitts et al. |
| 2012/0245838 A1 | 9/2012 | Van Doorselaer |
| 2012/0252418 A1 | 10/2012 | Kandekar et al. |
| 2012/0268249 A1 | 10/2012 | Kansal et al. |
| 2012/0282887 A1 | 11/2012 | Khoo et al. |
| 2012/0284297 A1 | 11/2012 | Aguera-Arcas et al. |
| 2012/0289217 A1 | 11/2012 | Riemer et al. |
| 2012/0289244 A1 | 11/2012 | Goyal |
| 2012/0302256 A1 | 11/2012 | Pai et al. |
| 2012/0302258 A1 | 11/2012 | Pai et al. |
| 2012/0302556 A1 | 11/2012 | Pai et al. |
| 2012/0306637 A1 | 12/2012 | McGough et al. |
| 2012/0306699 A1 | 12/2012 | Schlesinger et al. |
| 2012/0311499 A1 | 12/2012 | Dellinger et al. |
| 2012/0317162 A1 | 12/2012 | Endsley et al. |
| 2013/0006469 A1 | 1/2013 | Green et al. |
| 2013/0018581 A1 | 1/2013 | Sidhu et al. |
| 2013/0023246 A9 | 1/2013 | Ellingham et al. |
| 2013/0031601 A1 | 1/2013 | Bott |
| 2013/0036211 A1* | 2/2013 | Messer .................. H04W 4/06 709/223 |
| 2013/0040629 A1 | 2/2013 | Sprigg et al. |
| 2013/0040654 A1 | 2/2013 | Parish |
| 2013/0040711 A1 | 2/2013 | Kim et al. |
| 2013/0055348 A1 | 2/2013 | Strauss et al. |
| 2013/0072172 A1 | 3/2013 | Chang et al. |
| 2013/0084847 A1 | 4/2013 | Tibbitts et al. |
| 2013/0093707 A1 | 4/2013 | Park et al. |
| 2013/0130742 A1 | 5/2013 | Dietz et al. |
| 2013/0158867 A1 | 6/2013 | Sidhu et al. |
| 2013/0188503 A1 | 7/2013 | Anepu et al. |
| 2013/0217416 A1 | 8/2013 | Matthews et al. |
| 2013/0225151 A1 | 8/2013 | King et al. |
| 2013/0225152 A1 | 8/2013 | Matthews et al. |
| 2013/0227431 A1 | 8/2013 | Vasudevan et al. |
| 2013/0295872 A1 | 11/2013 | Guday et al. |
| 2013/0295913 A1 | 11/2013 | Matthews et al. |
| 2013/0298037 A1 | 11/2013 | Matthews et al. |
| 2013/0303143 A1 | 11/2013 | Schrader |
| 2013/0305319 A1 | 11/2013 | Matthews et al. |
| 2013/0305354 A1 | 11/2013 | King et al. |
| 2014/0024354 A1 | 1/2014 | Haik et al. |
| 2014/0068755 A1 | 3/2014 | King et al. |
| 2014/0189608 A1 | 7/2014 | Shuttleworth et al. |
| 2014/0199966 A1 | 7/2014 | Schushan |
| 2015/0011203 A1 | 1/2015 | Schrader et al. |
| 2015/0074615 A1 | 3/2015 | Han et al. |
| 2015/0213252 A1 | 7/2015 | Wilairat |
| 2015/0220712 A1 | 8/2015 | King et al. |
| 2015/0286840 A1 | 10/2015 | Karlson et al. |
| 2016/0197968 A1 | 7/2016 | Vasudevan et al. |
| 2016/0248906 A1 | 8/2016 | Schrader et al. |
| 2016/0353383 A1 | 12/2016 | Haik et al. |

FOREIGN PATENT DOCUMENTS

| | | |
|---|---|---|
| CN | 101005525 A | 7/2007 |
| CN | 101112072 A | 1/2008 |
| CN | 101251589 A | 8/2008 |
| CN | 101341718 A | 1/2009 |
| CN | 101341727 A | 1/2009 |
| CN | 101378568 A | 3/2009 |
| CN | 101487716 A | 7/2009 |
| CN | 101569212 A | 10/2009 |
| CN | 101617304 A | 12/2009 |
| CN | 101778165 A | 7/2010 |
| CN | 101785038 A | 7/2010 |
| CN | 101815116 A | 8/2010 |
| CN | 101828162 A | 9/2010 |
| CN | 102006550 A | 4/2011 |
| CN | 102204374 A | 9/2011 |
| CN | 102239469 A | 11/2011 |
| CN | 102239740 A | 11/2011 |
| EP | 2169946 A2 | 3/2010 |
| EP | 2293016 A2 | 3/2011 |
| EP | 2369864 A2 | 9/2011 |
| EP | 2451139 A1 | 5/2012 |
| EP | 2469442 A1 | 6/2012 |
| JP | 07203015 | 8/1995 |
| JP | 2000270048 A | 9/2000 |
| JP | 2002142010 A | 5/2002 |
| JP | 2002530783 A | 9/2002 |
| JP | 2003032353 A | 1/2003 |
| JP | 2004102835 A | 4/2004 |
| JP | 2005303509 A | 10/2005 |
| JP | 2005340976 A | 12/2005 |
| JP | 2006146598 A | 6/2006 |
| JP | 2006279506 A | 10/2006 |
| JP | 2006303732 A | 11/2006 |
| JP | 2007104464 A | 4/2007 |
| JP | 2007257140 A | 10/2007 |
| JP | 2009017239 A | 1/2009 |
| JP | 2009521753 A | 6/2009 |
| JP | 2009172239 A | 8/2009 |
| JP | 2010010845 A | 1/2010 |
| JP | 2010503082 A | 1/2010 |
| JP | 2010541046 A | 12/2010 |
| JP | 2011023798 A | 2/2011 |
| JP | 2011199637 A | 10/2011 |
| JP | 2011216043 A | 10/2011 |
| JP | 2012049688 A | 3/2012 |
| JP | 2012511282 A | 5/2012 |
| JP | 2013041512 A | 2/2013 |
| JP | 2013540321 A | 10/2013 |
| KR | 20050037613 A | 4/2005 |
| KR | 20060107826 A | 10/2006 |
| KR | 20100074218 A | 7/2010 |
| KR | 20100083396 A | 7/2010 |
| KR | 20110093528 A | 8/2011 |
| KR | 20110102880 A | 9/2011 |
| KR | 20110116383 A | 10/2011 |
| KR | 20110119283 A | 11/2011 |
| WO | 2005031544 A2 | 4/2005 |
| WO | 2006/054858 A1 | 5/2006 |
| WO | 2006/088273 A1 | 8/2006 |
| WO | 2006/099535 A1 | 9/2006 |
| WO | 2007/130123 A1 | 11/2007 |
| WO | 2008010803 A1 | 1/2008 |
| WO | 2009016505 A2 | 2/2009 |
| WO | 2009/105666 A1 | 8/2009 |
| WO | 2010/065752 A2 | 6/2010 |
| WO | 2010/147610 A1 | 12/2010 |
| WO | 2011/035390 A1 | 3/2011 |
| WO | 2011/135359 A1 | 3/2011 |
| WO | 2012047412 A1 | 4/2012 |
| WO | 2013/061156 A2 | 5/2013 |

OTHER PUBLICATIONS

Wei et al., "PATS: A Framework of Pattern-Aware Trajectory Search", IEEE Eleventh International Conference on Mobile Data Management, May 23, 2010, pp. 372-377, 6 pages.

Liu et al., "Location awareness through trajectory prediction", Computers, Environment and Urban Systems 30.6, 2006, pp. 741-756, 16 pages.

Ashbrook et al., "Using GPS to Learn Significant Locations and Predict Movement Across Multiple Users", Personal and Ubiquitous Computing, vol. 7, No. 5, Oct. 2003, 15 pages.

Dissanayake et al., "A Solution to the Simultaneous Localization and Map Building (SLAM) Problem", Proceedings of IEEE Transactions on Robotics and Automation, vol. 17, No. 3, Jun. 2001, pp. 229-241, 13 pages.

Response filed Mar. 23, 2015 to the Non-Final Office Action dated Jan. 7, 2015 from U.S. Appl. No. 13/726,099, 11 pages.

Applicant-Initiated Interview Summary dated Jun. 4, 2015 from U.S. Appl. No. 13/726,099, 3 pages.

Response filed Aug. 3, 2015 to the Final Office Action dated May 8, 2015 from U.S. Appl. No. 13/726,099, 13 pages.

Examiner Amendment filed Sep. 8, 2015 from U.S. Appl. No. 13/726,099, 9 pages.

(56) References Cited

OTHER PUBLICATIONS

Notice of Allowance and Examiner-Initiated Interview Summary dated Sep. 17, 2015 from U.S. Appl. No. 13/726,099, 15 pages.
Corrected Notice of Allowance and Examiner-Initiated Interview Summary dated Dec. 17, 2015 from U.S. Appl. No. 13/726,099, 15 pages.
U.S. Appl. No. 61/695,294 titled "Mobile Device Kid Space" filed Aug. 30, 2012 by inventors King et al., 20 pages.
Terminal Disclaimer filed Feb. 20, 2015 from U.S. Appl. No. 13/875,139, 2 pages.
Terminal Disclaimer Review Decision mailed Feb. 23, 2015 from U.S. Appl. No. 13/875,139, 1 page.
Electronic Terminal Disclaimer Filed and Approved Feb. 25, 2015 from U.S. Appl. No. 13/875,139, 3 pages.
Notice of Allowance dated Feb. 20, 2015 from U.S. Appl. No. 12/897,586, 3 pages.
U.S. Appl. No. 61/580,137 titled "Mobile Device Parental Control," filed Dec. 23, 2011 by Inventors Joseph H. Matthews et al., 18 pages.
Preliminary Amendment filed Dec. 18, 2013 from U.S. Appl. No. 13/726,027, 8 pages.
Response filed Sep. 9, 2014 to the Non-Final Office Action dated Jun. 24, 2014 from U.S. Appl. No. 13/726,027, 14 pages.
Response filed Apr. 6, 2015 to the Final Office Action dated Jan. 5, 2015 from U.S. Appl. No. 13/726,027, 15 pages.
Non-Final Office Action dated Aug. 13, 2015 from U.S. Appl. No. 13/726,027, 26 pages.
Response filed Dec. 14, 2015 to the Non-Final Office Action dated Aug. 13, 2015 from U.S. Appl. No. 13/726,027, 11 pages.
Final Office Action dated Apr. 14, 2016 from U.S. Appl. No. 13/726,027, 22 pages.
Preliminary Report on Patentability dated Jul. 3, 2014 from PCT Patent Application No. PCT/US2012/071546, 7 pages.
Response filed Jul. 23, 2015 to the Official Communication dated May 26, 2015 from European Patent Application No. 12859972.7, 17 pages.
U.S. Appl. No. 61/580,143 titled "Mobile Device Family Coordination," filed Dec. 23, 2011 by inventors Joseph H. Matthews et al., 21 pages.
U.S. Appl. No. 13/726,092, filed Dec. 22, 2012, 467 pages. Cited in 2 parts.
International Preliminary Report on Patentability dated Jul. 3, 2014 from PCT Patent Application No. PCT/US2012/071555, 5 pages.
Response filed Oct. 14, 2015 to the Examination Report filed Jul. 7, 2015 from European Patent Application No. 12860373.5, 15 pages.
First Office Action and Search Report dated Jan. 21, 2016 from China Patent Application No. 20128004066.6, 12 pages.
Response filed Jun. 6, 2016 to the First Office Action and Search Report dated Jan. 21, 2016 from China Patent Application No. 20128004066.6, 11 pages.
U.S. Appl. No. 61/580,147 titled "Mobile Device Shared," filed Dec. 23, 2011 by Inventors Joseph H. Matthews et al., 17 pages.
Petition to Withdraw from Issue and Amendment filed Mar. 24, 2016 from U.S. Appl. No. 13/726,099, 9 pages.
International Preliminary Report on Patentability dated Jul. 3, 2014 from PCT Patent Application No. PCT/US2012/071557, 6 pages.
Response filed Jun. 10, 2015 to the Examination Report dated Feb. 12, 2015 from European Patent Application No. 12859485.0, 18 pages.
Summons pursuant to Rule 115(1) EPC dated May 4, 2016 from European Patent Application No. 12859485.0, 8 pages.
Request for Examination and Voluntary Amendment filed Dec. 15, 2015 from Japan Patent Application No. 2014-548998, 11 pages.
Response filed Jul. 13, 2015 to the Non-Final Office Action dated Jun. 8, 2015 from U.S. Appl. No. 14/686,300, 9 pages.
Response filed Oct. 27, 2015 to the Final Office Action dated Jul. 29, 2015 from U.S. Appl. No. 14/686,300, 10 pages.
Non-Final Office Action dated Nov. 30, 2015 from U.S. Appl. No. 14/686,300, 15 pages.

Applicant-Initiated Interview Summary dated Feb. 4, 2016 from U.S. Appl. No. 14/686,300, 3 pages.
Response filed Feb. 29, 2016 to the Non-Final Office Action dated Nov. 30, 2015 from U.S. Appl. No. 14/686,300, 11 pages.
Final Office Action dated Apr. 8, 2016 from U.S. Appl. No. 14/686,300, 20 pages.
Preliminary Amendment filed Apr. 8, 2014 from U.S. Appl. No. 13/726,031, 8 pages.
Non-Final Office Action dated Jul. 8, 2014 from U.S. Appl. No. 13/726,031, 17 pages.
Applicant-Initiated Interview Summary dated Nov. 20, 2014 from U.S. Appl. No. 13/726,031, 3 pages.
Response filed Dec. 1, 2014 to the Non-Final Office Action dated Jul. 8, 2014 from U.S. Appl. No. 13/726,031, 11 pages.
Final Office Action dated Apr. 13, 2015 from U.S. Appl. No. 13/726,031, 15 pages.
Response filed Jun. 3, 2015 to the Final Office Action dated Apr. 13, 2015 from U.S. Appl. No. 13/726,031, 13 pages.
Non-Final Office Action dated Aug. 27, 2015 from U.S. Appl. No. 13/726,031, 18 pages.
Response filed Nov. 25, 2015 to the Non-Final Office Action dated Aug. 27, 2015 from U.S. Appl. No. 13/726,031, 12 pages.
Final Office Action dated Mar. 24, 2016 from U.S. Appl. No. 13/726,031, 21 pages.
International Search Report and Written Opinion dated Feb. 27, 2013 from PCT Application No. PCT/US2012/071544, 9 pages.
Preliminary Report on Patentability dated Jul. 3, 2014 from PCT Patent Application No. PCT/US2012/071544, 6 pages.
European Search Report dated May 4, 2015 from European Patent Application No. 12860403.0, 3 pages.
Examination Report dated May 20, 2015 from European Patent Application No. 12860403.0, 4 pages.
Response filed Jun. 25, 2015 to the Examination Report dated May 20, 2015 from European Patent Application No. 12860403.0, 15 pages.
Preliminary Amendment filed Nov. 26, 2013 from U.S. Appl. No. 13/726,090, 9 pages.
Response filed Sep. 24, 2014 to the Non-Final Office Action dated Jun. 24, 2014 from U.S. Appl. No. 13/726,090, 16 pages.
Response filed Jan. 14, 2015 to the Final Office Action dated Oct. 2, 2014 from U.S. Appl. No. 13/726,090, 19 pages.
Response filed Aug. 17, 2015 to the Non-Final Office Action dated Jun. 23, 2015 from U.S. Appl. No. 13/726,090, 17 pages.
Final Office Action dated Dec. 15, 2015 from U.S. Appl. No. 13/726,090, 49 pages.
Response filed May 25, 2016 to the Final Office Action dated Dec. 15, 2015 from U.S. Appl. No. 13/726,090, 13 pages.
Non-Final Office Action dated Jun. 3, 2016 from U.S. Appl. No. 13/726,090, 32 pages.
Preliminary Report on Patentability dated Jul. 3, 2014 from PCT Patent Application No. PCT/US2012/071559, 7 pages.
Extended European Search Report dated May 13, 2015 from European Patent Application No. 12859600.4, 7 pages.
Response filed Aug. 10, 2015 to the Examination Report dated Jun. 1, 2015 from European Patent Application No. 12859600.4, 17 pages.
U.S. Appl. No. 13/726,040, filed Dec. 22, 2012, 497 pages. Cited in two parts.
Preliminary Amendment dated Nov. 26, 2013 from U.S. Appl. No. 13/726,049, 7 pages.
Response filed Aug. 1, 2014 to the Election/Restriction dated Jul. 1, 2014 from U.S. Appl. No. 13/726,049, 8 pages.
Response filed Mar. 3, 2015 to the Non-Final Office Action dated Dec. 4, 2014 from U.S. Appl. No. 13/726,049, 14 pages.
Response filed Aug. 17, 2015 to the Non-Final Office Action dated Jul. 7, 2015 from U.S. Appl. No. 13/726,049, 17 pages.
Notice of Non-Compliant Amendment dated Sep. 9, 2015 from U.S. Appl. No. 13/726,049, 3 pages.
Response filed Sep. 15, 2015 to the Notice of Non-Compliant Amendment dated Sep. 9, 2015 from U.S. Appl. No. 13/726,049, 17 pages.
Final Office Action dated Feb. 1, 2016 from U.S. Appl. No. 13/726,049, 18 pages.

(56) References Cited

OTHER PUBLICATIONS

Response/Amendment filed Apr. 28, 2016 to the Final Office Action dated Feb. 1, 2016 from U.S. Appl. No. 13/726,049, 11 pages.
Notice of Allowance dated Jun. 9, 2016 from U.S. Appl. No. 13/726,049, 8 pages.
Response filed Aug. 19, 2014 to the Election/Restriction dated Jun. 20, 2014 from U.S. Appl. No. 13/726,048, 10 pages.
Response filed Apr. 9, 2015 to the Non-Final Office Action dated Dec. 9, 2014 from U.S. Appl. No. 13/726,048, 16 pages.
Final Office Action dated Aug. 5, 2015 from U.S. Appl. No. 13/726,048, 19 pages.
Amendment/Response filed Nov. 5, 2015 to the Final Office Action dated Aug. 5, 2015 from U.S. Appl. No. 13/726,048, 14 pages.
Non-Final Office Action dated Nov. 20, 2015 from U.S. Appl. No. 13/726,048, 27 pages.
Amendment/Response filed Feb. 22, 2016 to the Non-Final Office Action dated Nov. 20, 2015 from U.S. Appl. No. 13/726,048, 18 pages.
Notice of Allowance dated Mar. 28, 2016 from U.S. Appl. No. 13/726,048, 12 pages.
Preliminary Amendment filed Dec. 11, 2013 from U.S. Appl. No. 13/726,095, 10 pages.
Response filed Nov. 17, 2014 to the Non-Final Office Action dated Aug. 15, 2014 from U.S. Appl. No. 13/726,095, 18 pages.
Response filed Apr. 6, 2015 to the Non-Final Office Action dated Jan. 5, 2015 from U.S. Appl. No. 13/726,095, 11 pages.
Response filed Aug. 6, 2015 to the Final Office Action dated May 8, 2015 from U.S. Appl. No. 13/726,095, 11 pages.
Notice of Allowance dated Aug. 28, 2015 from U.S. Appl. No. 13/726,095, 12 pages.
Preliminary Report on Patentability dated Mar. 12, 2015 from PCT Patent Application No. PCT/US2012/071562, 6 pages.
Extended European Search Report dated Apr. 22, 2016 from European Patent Application No. 12883789.5, 7 pages.
Request for Examination and Voluntary Amendment filed Nov. 20, 2015 from Japan Patent Application No. 2015-529778, 7 pages.
Preliminary Amendment filed Nov. 26, 2013 from U.S. Appl. No. 13/726,097, 9 pages.
Response filed May 12, 2014 to the Election/Restriction dated Mar. 21, 2014 from U.S. Appl. No. 13/726,097, 9 pages.
Preliminary Report on Patentability dated Jul. 3, 2014 from PCT Patent Application No. PCT/US2012/071545, 6 pages.
Response filed Jun. 9, 2015 to the Examination Report dated Feb. 16, 2015 from European Patent Application No. 12860631.6, 15 pages.
Examination Report dated Apr. 21, 2016 from European Patent Application No. 12860631.6, 5 pages.
Response filed May 30, 2016 to the Examination Report dated Apr. 21, 2016 from European Patent Application No. 12860631.6, 9 pages.
Response filed Aug. 19, 2015 to the Non-Final Office Action dated Jul. 2, 2015 from U.S. Appl. No. 14/495,418, 11 pages.
Electronic Terminal Disclaimer Filed and Approved Aug. 27, 2015 from U.S. Appl. No. 14/495,418, 3 pages.
Notice of Allowance dated Oct. 7, 2015 from U.S. Appl. No. 14/495,418, 9 pages.
Notice of Allowance dated Feb. 5, 2016 from U.S. Appl. No. 14/495,418, 28 pages.
Corrected Notice of Allowability dated Feb. 25, 2016 from U.S. Appl. No. 14/495,418, 6 pages.
Corrected Notice of Allowability dated Feb. 29, 2016 from U.S. Appl. No. 14/495,418, 6 pages.
U.S. Appl. No. 61/052,455 titled "Owner Privacy in a Shared Mobile Device," filed May 12, 2008 by inventors Amy Karlson, Alice Brush, and Stuart Schechter, 27 pages.
Preliminary Report on Patentability dated Nov. 25, 2010 from PCT Patent Application No. PCT/US2009/039509, 6 pages.
Communication pursuant to Rule 70(2) dated Feb. 5, 2013 from European Patent Application No. 09747072.8, 1 page.

Response filed Aug. 9, 2013 to the Communication pursuant to Rule 70(2) dated Feb. 5, 2013 from European Patent Application No. 09747072.8, 14 pages.
Response filed Dec. 27, 2012 to the First Office Action dated Dec. 19, 2012 from China Patent Application No. 200980128048.8, 13 pages.
Response filed Jul. 22, 2013 to the Second Office Action dated May 6, 2013 from China Patent Application No. 200980128048.8, 9 pages.
Response filed Feb. 12, 2014 to the Third Office Action dated Dec. 2, 2013 from China Patent Application No. 200980128048.8, 12 pages.
International Preliminary Report on Patentability dated Apr. 18, 2013 from PCT Application No. PCT/US2011/049614, 5 pages.
Voluntary Amendment dated Aug. 3, 2012 from China Patent Application No. 201110317851.5, 9 pages.
Response filed Jan. 8, 2014 to the First Office Action dated Dec. 4, 2013 from China Patent Application No. 201110317851.5, 20 pages.
Response filed Jul. 22, 2014 to the Second Office Action dated May 8, 2014 from China Patent Application No. 201110317851.5, 17 pages.
Response filed Jan. 28, 2015 to the Third Office Action dated Nov. 14, 2014 from China Patent Application No. 201110317851.5, 17 pages.
Response filed Aug. 3, 2015 to the Fourth Office Action dated May 20, 2015 from China Patent Application No. 201110317851.5, 60 pages.
Notice on Grant dated Dec. 2, 2015 from China Patent Application No. 201110317851.5, 7 pages.
Response filed Jul. 18, 2014 to the First Examination Report dated Jun. 20, 2014 from Australia Patent Application No. 2011312743, 55 pages.
Response filed Sep. 22, 2014 to the Second Examination Report dated Aug. 15, 2014 from Australia Patent Application No. 2011312743, 36 pages.
Examination Report dated May 9, 2014 from European Patent Application No. 11831134.9, 5 pages.
Response filed Jun. 12, 2014 to the Examination Report dated May 9, 2014 from European Patent Application No. 11831134.9, 9 pages.
Office Action dated Aug. 13, 2015 from Israel Patent Application No. 225450, 6 pages.
Request for Examination and Amendment filed Jul. 26, 2014 from Japan Patent Application No. 2013-532806, 10 pages.
Response filed Aug. 14, 2015 to the First Office Action dated Jun. 10, 2015 from Japan Patent Application No. 2013-532806, 13 pages.
Notice of Acceptance dated Mar. 25, 2014 from South Africa Patent Application No. 2013/02207, 1 page.
Karlson, Amy K. "Usage Profiles for the Mobile Phone," Workshop on Security and Privacy Issues in Mobile Phone Use, May 2008, 3 pages.
Lin et al. "Energy-Accuracy Aware Localization for Mobile Devices," Proceedings of the 8th International Conference on Mobile Systems, Applications, and Services (MobiSys' 10), Jun. 2010, 14 pages.
Requirement for Restriction Election dated Mar. 21, 2014 from U.S. Appl. No. 13/551,613, 8 pages.
Response filed Apr. 28, 2014 to the Requirement for Restriction Election dated Mar. 21, 2014 from U.S. Appl. No. 13/551,613, 13 pages.
Non-Final Office Action dated Aug. 13, 2014 from U.S. Appl. No. 13/551,613, 16 pages.
Response filed Nov. 13, 2014 to the Non-Final Office Action dated Aug. 13, 2014 from U.S. Appl. No. 13/551,613, 17 pages.
Final Office Action dated Mar. 11, 2015 from U.S. Appl. No. 13/551,613, 15 pages.
Response filed Jun. 16, 2015 to the Final Office Action dated Mar. 11, 2015 from U.S. Appl. No. 13/551,613, 16 pages.
Non-Final Office Action dated Jul. 16, 2015 from U.S. Appl. No. 13/551,613, 11 pages.
Response filed Dec. 12, 2015 to the Non-Final Office Action dated Jul. 16, 2015 from U.S. Appl. No. 13/551,613, 13 pages.

(56) References Cited

OTHER PUBLICATIONS

Ex Parte Quayle Action and Examiner-Initiated Interview Summary dated Mar. 9, 2016 from U.S. Appl. No. 13/551,613, 5 pages.
Response filed May 9, 2016 to the Ex Parte Quayle Action and Examiner-Initiated Interview Summary dated Mar. 9, 2016 from U.S. Appl. No. 13/551,613, 5 pages.
Notice of Allowance dated Jun. 6, 2016 from U.S. Appl. No. 13/551,613, 7 pages.
U.S. Appl. No. 60/721,879 titled "Predestination," filed Sep. 29, 2005 by inventors Eric J. Horvitz and John C. Krumm, 31 pages.
International Report on Patentability dated Jan. 29, 2015 from PCT Patent Application No. PCT/US2013/050963, 11 pages.
First Office Action dated Dec. 31, 2015 from Chinese Patent Application No. 201380038072.9, 14 pages.
Response filed May 16, 2016 to the First Office Action dated Dec. 31, 2015 from Chinese Patent Application No. 201380038072.9, 7 pages.
Communication pursuant to Rules 161(1) and 162 EPC dated Feb. 26, 2015 from European Patent Application No. 13748129.7, 2 pages.
Response filed Jul. 31, 2015 to the Communication pursuant to Rules 161(1) and 162 EPC dated Feb. 26, 2015 from European Patent Application No. 13748129.7, 9 pages.
Request for Examination and Voluntary Amendment filed Jun. 15, 2016 from Japanese Patent Application No. 2015-523237, 8 pages.
Preliminary Amendment filed Mar. 17, 2016 from U.S. Appl. No. 15/071,960, 9 pages.
Non-Final Office Action dated Jun. 23, 2016 from U.S. Appl. No. 13/726,099, 18 pages.
Response filed Sep. 23, 2016 to the Non-Final Office Action dated Jun. 23, 2016 from U.S. Appl. No. 13/726,099, 15 pages.
Response filed Sep. 6, 2016 to the Non-Final Office Action dated Jun. 3, 2016 from U.S. Appl. No. 13/726,090, 14 pages.
Notice of Allowance dated Jul. 18, 2016 from U.S. Appl. No. 13/726,049, 9 pages.
Office Action dated Jun. 10, 2015 from Japanese Patent Application No. 2013-532806, 9 pages.
Supplementary European Search Report dated Jun. 25, 2015 from European Patent Application No. 12860373.5, 3 pages.
Examination Report dated Jul. 7, 2015 from European Patent Application No. 12860373.5, 6 pages.
Examination Report dated May 26, 2015 from European Patent Application No. 12859972.7, 4 pages.
Examination Report dated Jun. 1, 2015 from European Patent Application No. 12859600.4, 8 pages.
Fourth Office Action dated May 20, 2015 from Chinese Patent Application No. 201110317851.5, 8 pages.
Office Action dated May 13, 2015 from Chilean Patent Application No. 201300886, 7 pages.
Preliminary Amendment filed Apr. 8, 2015 from U.S. Appl. No. 14/681,923, 8 pages.
Non-Final Office Action dated Jun. 8, 2015 from U.S. Appl. No. 14/686,300, 12 pages.
Final Office Action dated Jul. 29, 2015 from U.S. Appl. No. 14/686,300, 36 pages.
Non-Final Office Action dated Jun. 23, 2015 from U.S. Appl. No. 13/726,090, 40 pages.
Non-Final Office Action dated Jul. 7, 2015 from U.S. Appl. No. 13/726,049, 21 pages.
Non-Final Office Action dated Jul. 2, 2015 from U.S. Appl. No. 14/495,418, 46 pages.
"How to Set Up an ICE Contact on Your iPhone", Jun. 21, 2010, retrieved at <<http://mn10.wordpress.com/2010/06/21/how-to-set-up-an-ice-contact-on-your-iphone/>>, 14 pages.
"IOS 5" Wikipedia, the free encyclopedia, released Oct. 12, 2011, retrieved at <<https://en.wikipedia.org/w/index.php?title=IOS_5&oldid=71296274>>, 6 pages.
"Kids Place—Parental Control", Oct. 31, 2011, retrieved at <<http://www.amazon.com/Kiddoware-Kids-Place-Parental-Control/dp/B0061S073A>> on May 29, 2013, 5 pages.
"Bluecasting," Wikipedia, the free encyclopedia, captured by the Internet Archive on Oct. 2, 2008 at <<http://en.wikipedia.org/wiki/Bluecasting>>, 1 page.
"Bluetooth Specification", captured by the Internet Archive on Oct. 19, 2008, at <<http://bluetooth.com/>>, 1 page.
"Location-Based Social Networking Marketing White Paper", The Marketer's Guide to Location-based Social Networks, Anvil Media, Inc., 2010, 14 pages.
Cramer, et al., "Performing a Check-in: Emerging Practices, Norms and 'Conflicts' in Location-Sharing Using Foursquare", Mobile HCI 2011, ACM, Aug. 30-Sep. 2, 2011, Stockholm, Sweden, 10 pages.
"Google Inc. Android Developers Reference: Locationmanager", captured by the Internet Archive on Jun. 27, 2009 at <<http://developer.android.com/>> 1 page.
"IOS 5 slowing iPhone 4 and 4S complaints", Oct. 25, 2011, captured by the Internet Archive at >>http://www.phonesreview.co.uk/2011/10/25/ios-5-slowing-iphone-4-and-4s-complaints/>> on Oct. 27, 2011, 2 pages.
Farrell et al., "Energy-Efficient Monitoring of Mobile Objects with Uncertainty-Aware Tolerances", Proceedings of the 11th International Database Engineering and Applications Symposium, IDEAS 2007, Sep. 6-8, 2007, 12 pages.
Galloway, David, "Android Parental Control Contains Kid Access to Your Smartphone", Aug. 27, 2011, retrieved at <<http://lifehacker.com/5835066/android-parental-control-contains-kid-access-to-your-smartphone>> on May 29, 2013, 3 pages.
Gupta et al., "Adding GPS-Control to Traditional Thermostats: An Exploration of Potential Energy Savings and Design Challenges", Proceedings of the 7th International Conference on Pervasive Computing, Berlin, Heidelberg, May 11-14, 2009, 18 pages.
Kamvar et al., "Deciphering Trends in Mobile Search", IEEE Computer Society, Aug. 2007, pp. 36-40, 5 pages.
Kansal et al., "Location and Mobility in a Sensor Network of Mobile Phones", Jun. 4, 2007, 17th International Workshop on Network and Operating Systems Support for Digital Audio and Video (NOSSDAV), 6 pages.
Kjaergaard et al., "EnTracked: Energy-Efficient Robust Position Tracking for Mobile Devices", Proceedings of the 7th International Conference on Mobile Systems, Applications, and Services, Krakow, Poland, Jun. 22-25, 2009, pp. 221-234, 14 pages.
Morton, Lynn, "6 Geolocation Apps You May Not Have Heard About", Mar. 27, 2011, retrieved from <<http://www.r2integrated.com/blog/index.php/6-geolocation-apps-you-may-not-haveheard-of/>> on Dec. 9, 2011, 4 pages.
Priyantha et al., "Demo Abstract: Enabling Energy Efficient Continuous Sensing on Mobile Phones with LittleRock", Proceedings of the 9th ACM/IEEE International Conference on Information Processing in Sensor Networks, Apr. 12-16, 2010, Stockholm, Sweden, pp. 420-421, 2 pages.
Sadeh et al., "Understanding and Capturing People's Privacy Policies in a People Finder Application", Personal and Ubiquitous Computing vol. 13, No. 6, Aug. 2009,13 pages.
Sharkey, Jeff, "Coding for Life—Battery Life, That Is", Google IO Developer Conference, May 27, 2009, 32 pages.
Steenson et al., "Beyond the Personal and Private: Modes of Mobile Phone Sharing in Urban India", Mobile Communication Research Annual, vol. 1, Transition Books, pp. 231-250, 20 pages.
Thiagarajan et al., "VTrack: Accurate, Energy-aware Road Traffic Delay Estimation Using Mobile Phones", Proceedings of the 7th ACM Conference on Embedded Networked Sensor Systems, Nov. 4-6, 2009, Berkeley, CA, 14 pages.
Non-Final Office Action dated Nov. 6, 2015 from U.S. Appl. No. 14/746,763, 29 pages.
Response filed Mar. 4, 2016 to the Non-Final Office Action dated Nov. 6, 2015 from U.S. Appl. No. 14/746,763, 9 pages.
Non-Final Office Action dated Jun. 30, 2016 from U.S. Appl. No. 14/746,763, 6 pages.
Response filed Sep. 26, 2016 to the Non-Final Office Action dated Jun. 30, 2016 from U.S. Appl. No. 14/746,763, 8 pages.
Response filed May 27, 2011 to Non-Final Office Action dated Mar. 17, 2011 from U.S. Appl. No. 12/197,213, 12 pages.

(56) References Cited

OTHER PUBLICATIONS

Response filed Dec. 6, 2011 to Final Office Action dated Sep. 20, 2011 from U.S. Appl. No. 12/197,213, 13 pages.
Preliminary Amendment filed Jun. 12, 2013 from U.S. Appl. No. 13/875,139, 7 pages.
Response filed Dec. 30, 2013 to Non-Final Office Action dated Oct. 3, 2013 from U.S. Appl. No. 13/875,139, 16 pages.
Response and Applicant Interview Summary dated Aug. 11, 2014 to Final Office Action dated May 9, 2014 from U.S. Appl. No. 13/875,139, 19 pages.
Response filed Jan. 26, 2015 to Non-Final Office Action dated Oct. 24, 2014 from U.S. Appl. No. 13/875,139, 17 pages.
Examiner Initiated Interview Summary dated Mar. 5, 2015 from U.S. Appl. No. 13/875,139, 1 page.
Response filed Oct. 27, 2011 to Non-Final Office Action dated Jun. 28, 2011 from U.S. Appl. No. 12/417,752, 17 pages.
Response filed Dec. 13, 2012 to Final Office Action dated Sep. 13, 2012 from U.S. Appl. No. 12/417,752, 13 pages.
Response filed Jul. 2, 2013 to Non-Final Office Action dated May 24, 2013 from U.S. Appl. No. 12/417,752, 16 pages.
Response filed Sep. 30, 2013 to Final Office Action dated Jul. 17, 2013 from U.S. Appl. No. 12/417,752, 18 pages.
Response filed Dec. 23, 2013 to Non-Final Office Action dated Oct. 29, 2013 from U.S. Appl. No. 12/417,752, 21 pages.
Examiner and Applicant Initiated Interview Summaries dated Feb. 25, 2014 from U.S. Appl. No. 12/417,752, 3 pages.
Non-Final Office Action dated Oct. 18, 2012 from U.S. Appl. No. 12/897,586, 14 pages.
Response filed Apr. 15, 2013 to Non-Final Office Action dated Oct. 18, 2012 from U.S. Appl. No. 12/897,586, 13 pages.
Final Office Action dated May 22, 2013 from U.S. Appl. No. 12/897,586, 13 pages.
Response filed Sep. 19, 2013 to Final Office Action dated May 22, 2013 from U.S. Appl. No. 12/897,586, 12 pages.
Applicant Initiated Interview Summary dated Aug. 13, 2014 from U.S. Appl. No. 12/897,586, 3 pages.
Response filed Aug. 20, 2014 to Non-Final Office Action dated May 8, 2014 from U.S. Appl. No. 12/897,586, 15 pages.
Notice of Allowance dated Jan. 5, 2015 from U.S. Appl. No. 12/897,586, 12 pages.
Response filed Aug. 14, 2012 to Non-Final Office Action dated May 4, 2012 from U.S. Appl. No. 12/912,456, 14 pages.
Response filed Dec. 11, 2012 to Non-Final Office Action dated Sep. 11, 2012 from U.S. Appl. No. 12/912,456, 17 pages.
Response filed Apr. 9, 2013 to Non-Final Office Action dated Jan. 9, 2013 from U.S. Appl. No. 12/912,456, 16 pages.
Response filed Jul. 18, 2013 to Non-Final Office Action dated May 29, 2013 from U.S. Appl. No. 12/912,456, 17 pages.
Applicant Initiated Interview Summary dated Jul. 24, 2013 from U.S. Appl. No. 12/912,456, 3 pages.
Response filed Nov. 18, 2013 to Final Office Action dated Sep. 6, 2013 from U.S. Appl. No. 12/912,456, 21 pages.
Applicant Initiated Interview Summary dated Nov. 19, 2013 from U.S. Appl. No. 12/912,456, 3 pages.
Response filed Aug. 26, 2013 to Non-Final Office Action dated Apr. 26, 2013 from U.S. Appl. No. 13/090,474, 15 pages.
Response filed Mar. 11, 2014 to Final Office Action dated Nov. 21, 2013 from U.S. Appl. No. 13/090,474, 16 pages.
Response filed Aug. 20, 2014 to Non-Final Office Action dated May 6, 2014 from U.S. Appl. No. 13/090,474, 15 pages.
Preliminary Amendment filed Dec. 10, 2013 from U.S. Appl. No. 13/726,043, 9 pages.
Non-Final Office Action dated Sep. 11, 2014 from U.S. Appl. No. 13/726,043, 42 pages.
Response filed Dec. 30, 2014 to the Non-Final Office Action dated Sep. 11, 2014 from U.S. Appl. No. 13/726,043, 17 pages.
Final Office Action dated Mar. 3, 2015 from U.S. Appl. No. 13/726,043, 24 pages.
Response filed May 12, 2015 to the Final Office Action dated Mar. 3, 2015 from U.S. Appl. No. 13/726,043, 16 pages.
Non-Final Office Action dated Oct. 8, 2015 from U.S. Appl. No. 13/726,043, 25 pages.
Response filed Jan. 6, 2016 to the Non-Final Office Action dated Oct. 8, 2015 from U.S. Appl. No. 13/726,043, 13 pages.
Notice of Allowance and Examiner-Initiated Interview Summary dated May 4, 2016 from U.S. Appl. No. 13/726,043, 16 pages.
Notice of Allowance dated Aug. 16, 2016 from U.S. Appl. No. 13/726,043, 14 pages.
Petition Decision dated Sep. 12, 2016 from U.S. Appl. No. 13/726,043, 2 pages.
"BroadCloud FamilyCenter", BroadSoft Data Sheet, retrieved at <<http://www.broadsoft.com/pdf/datasheet-broadcloud-familycenter.pdf>> on Dec. 13, 2011, 1 page.
"CameraLock Cydia Tweak—Add A Camera Button to Your Lockscreen Without iOS 5—iPhone & iPod Touch", published Jun. 21, 2011, retrieved at >>https://www.youtube.com/watch?v=ECGm540B6eO>>, 1 page.
"Distracted Driving Information Clearinghouse", FCC Encyclopedia, published Jul. 27, 2011, retrieved at <<http://www.fcc.gov/encyclopedia/distracted-driving-information-clearinghouse>>, 4 pages.
"How can I see a list of all users on the logon screen?", Nov. 7, 2011, retrieved at <<http://superuser.com/questions/354856/how-can-i-see-a-list-of-all-users-on-the-logonscreen>>, 2 pages.
"How can one add an image to the windows 7 login screen?", Sep. 5, 2012, retrieved at <<http://superuser.com/questions/470568/how-can-one-add-an-image-to-the-windows-7-ogin-screen>>, 3 pages.
"ICloud: What you need to know", MacWorld.com, published Jun. 8, 2011, retrieved at <<http://www.macworld.com/article/160380/2011/06/icloud_what_you_need_to_know.html>, 16 pages.
"Ignite Where & Launch Pad", O'Reilly, Where 2.0 Conference 2008, published May 12, 2008, retrieved at <<http://en.oreilly.com/where2008/public/schedule/detail/2572>>, 4 pages.
"In Case of Emergency (ICE) and smart phone with lock screens", ARS Technica OpenForum, Mar. 29, 2011, retrieved at <<http://arstechnica.com/civis/viewtopic.php?f=20&t=1140661>>, 8 pages.
"iPad Parental Control (restricting app access)", iPad Reviews, Jailbreak Guides, retrieved at <<http://ipaded.net/ipad/parental-control/>> on Feb. 29, 2012, 5 pages.
"Mobile phone match-up", captured by the Internet archive on Sep. 30, 2010 at <<http://www.microsoft.com/windowsmobile/enus/meet/version-compare.mspx>>, 4 pages.
"Mobile Task Tracker Screen Shots", retrieved at <<http://www.mobiletasktracker.com/Screen%20Shots.html>> on Jul. 13, 2011, 4 pages.
"No Tech Panacea for Tech-Distracted Driving", published Dec. 6, 2011, retrieved at <<http://mobile.slashdot.org/story/12/06/11/0556231/no-tech-panacea-for-tech-distracted-driving, 27 pages.
"Parental Control Software for Cell Phones", retrieved at <<http://www.parentalcontrolcellphones.com/>> on Dec. 8, 2011, 5 pages.
"Restrict Access to Applications using AppLocker", retrieved at <<http://www.dq.winsila.com/tips-tricks/restrict-access-to-applications-usingapplocker.html>> on Feb. 13, 2012, 2 pages.
"Restrict Access to Programs with AppLocker in Windows 7", published Nov. 12, 2009, retrieved at <<http://www.howtogeek.com/howto/6317/block-users-from-using-certain-applicationswith-pplocker/>>, 9 pages.
"Safe Driving System", captured by the Internet archive on May 12, 2010 at <<http://web.archive.org/web/20100512220953/http://key2safedriving.com/>, 2 pages.
"Setting up and Using Smart Unlock on the Samsung Jet", published Sep. 10, 2009, retrieved at <<http://www.knowyourmobile.com/samsung/samsungjet/samsungjetuserguides/317988/setting_up_and_using_smart_unlock_on_the_samsung_jet.html>>, 2 pages.
"Setting Up Simple Restricted Access", retrieved at <<http://support.webvanta.com/support_article/615777-setting-up-simple-restricted-access>> on Feb. 29, 2012, 3 pages.
"Timeline of Microsoft Windows", published Dec. 14, 2014, retrieved at <<http://en.wikipedia.org/wiki/Timeline_of_Microsoft_Windows>>, 5 pages.
"T-Mobile G1 Google Android phone—Gesture unlocking", published Jun. 20, 2010, retrieved at <<http://www.gadgetuniversegift.com/?p=2121>>, 2 pages.

(56) References Cited

OTHER PUBLICATIONS

"T-Mobile G1 User Manual", published May 27, 2009, retrieved at <<http://www.manualslib.com/manual/574808/T-Mobile-G1.html#manual>>, pp. 102-103, 5 pages.
"Welcome to Sprint Drive First", retrieved at >>https://drivefirst.sprint.com/welcome.htm>> on Nov. 20, 2013, 2 pages.
"What's an Android? and Other Smart(phone) Questions", published Sep. 6, 2010, retrieved at <<http://bestbuybusinessdistrict.com/knowlege-center/58-what'27s-an-android-andother-smart-phone-questions>>, 4 pages.
"Your Very Own Support Geek", published Jan. 7, 2010, retrieved at <<http://yoursupportgeek.info/miscellaneous-geek-stuff/t-mobile-uk-to-offer-icd-vega-15-inch-tegra-android-tablet-in-2010>>, 2 pages.
Aalto et al., "Bluetooth and WAP Push Based Location-Aware Mobile Advertising System", ACM, MobiSYS '04, Jun. 6-9, 2004, Boston, MA, 10 pages.
Abdelzaher et al., "Mobiscopes for Human Spaces", IEEE Pervasive Computing, vol. 6, No. 2, Apr.-Jun. 2007, 11 pages.
Abdesslem et al., "Less is More: Energy-Efficient Mobile Sensing with SenseLess", MobiHeld '09, Aug. 17, 2009, pp. 61-62, 2 pages.
Agarwal et al., "Somniloquy: Augmenting Network Interfaces to Reduce PC Energy Usage", 6th USENIX Symposium on Networked Systems Design and Implementation (NSDI), 2009, Apr. 23, 2009, pp. 365-380, 16 pages.
"Aventail and Trust Digital Launch Integrated Secure Mobile Access Solution", Feb. 2006, retrieved at <<http://findarticles.com/p/articles/mi_pwwi/is_200602/ai_n16063742/?tag =content;col1>> on Feb. 29, 2012, 3 pages.
Azizyan et al., "SurroundSense: Mobile Phone Localization Using Ambient Sound and Light", retrieved at <<http://synrg.ee.duke.edu/papers/surroundsense-poster.pdf>> on Feb. 5, 2009, 1 page.
Bahl et al., "RADAR: An In-Building RF-based User Location and Tracking System", Microsoft Research, Proceedings of IEEE Infocom 2000, Tel-Aviv, Israel, Mar. 2000, 10 pages.
Balakrishnan et al., "ITR: Scalable Location-Aware Monitoring (SLAM) Systems", Nov. 9, 2001, Laboratory for Computer Science & Department of EECS, MIT, Cambridge, MA, retrieved at <<http://nms.lcs.mit.edu/projects/slam/prop.pdf>>, 31 pages.
Barroso et al., "The Case for Energy-Proportional Computing", IEEE Computer Society, vol. 40. No. 12, Dec. 2007, pp. 33-37, 5 pages.
Bhandari,"Full Touchscreen Samsung Star (55233), Star 3G (S5603) and Beat DJ Launched in India", retrieved at <<http://www.tecfre.com/full-touchscreen-samsung-stars5233-star-3g-s5603-and-beat-dj-launched-in-india/>> on May 13, 2009, 12 pages.
Bilderbeek, Pim, "From Unified to Social Communications and Collaboration", retrieved at <<http://www.themetisfiles.com/2011/10/from-unified-to-socialcommunications-and-collaboration/>> on Dec. 13, 2011, 4 pages.
Branscombe, Mary, "Kids Corner and Wallet", published Jan. 25, 2012, retrieved at <<http://www.techradar.com/reviews/pc-mac/software/operating-systems/windows-phone-8-1086692/review/6>>, 7 pages.
Burke et al., "Participatory Sensing", WSW '06 at SenSys '06, Oct. 31, 2006, 5 pages.
Campbell et al., "Biometrically Enhanced Software-Defined Radios", Proceedings of the Software Defined Radio Technical Conference, Nov. 2003, Orlando, Florida, 6 pages.
Chen, Brian, "Here's the Google Phone Apple Wants You to Have", published Mar. 5, 2010, retrieved at <<http://www.wired.com/2010/03/apple-htc-google/>, 9 pages.
Chiu et al., "Playful Bottle: a Mobile Social Persuasion System to Motivate Healthy Water Intake", Proceedings of the 11th International Conference on Ubiquitous Computing, Sep. 30-Oct. 3, 2009, 10 pages.
Ciprian, "Manage User Accounts", published May 8, 2007, captured by the Internet Archive on Jan. 16, 2012 at <<http://www.vista4beginners.com/Manage-User-Accounts>>, 13 pages.
Consolvo et al., "Flowers or a Robot Army? Encouraging Awareness & Activity with Personal, Mobile Displays", Proceedings of the 10th International Conference on Ubiquitous Computing, vol. 12, No. 4, Sep. 21-24, 2008, 10 pages.
Constandache et al., "Energy-Aware Localization Using Mobile Phones", Mobisys Poster, Jun. 2008, 1 page.
Constandache et al., "Energy-efficient Localization Via Personal Mobility Profiling", Proceedings of MobiCASE 2009, Oct. 2009, 20 pages.
Covington et al., "Parameterized Authentication", Proceedings of the 9th European Symposium on Research Computer Security, Lecture notes in Computer Science, Sep. 2004, 18 pages.
Cui, Yanqing, "Facilitating Consumption of Online Social Networking Services on Mobile Devices", Proceedings of the 13th International Conference on Ubiquitous Computing, Sep. 17-21, 2011, 4 pages.
Davies, Chris, "T-Mobile UK to offer ICD Vega 15-inch Tegra Android tablet in 2010", published Jan. 7, 2010, captured by the Internet archive at <<http://www.slashgear.com/t-mobile-uk-to-offer-icd-vega-15-inch-tegra-android-tablet-in-2010-0768671/>> on Jan. 10, 2010, 5 pages.
Dipane, Jared, "Sprint to bring parental locks to Android phones to prevent use while driving", published Mar. 22, 2011, retrieved at <<http://www.androidcentral.com/sprint-bring-parentallocks-android-phones-prevent-use-while-driving>>, 7 pages.
Flinn, Jason, "Extending Mobile Computer Battery Life through Energy-Aware Adaptation", Dec. 2001, School of Computer Science, Carnegie Mellon University, Pittsburgh, PA, retrieved at <<http://reports-archive.adm.cs.cmu.edu/anon/2001/CMU-CS-01-171.pdf>>, 165 pages.
Foster et al., "Precision and accuracy of an ankle-worn accelerometer-based pedometer in step counting and energy expenditure", Preventive Medicine, vol. 41, No. 3-4, Oct. 2005, pp. 778-783, 6 pages.
Gaonkar et al., "Micro-Blog: Sharing and Querying Content through Mobile Phones and Social Participation", ACM, MobiSys 2008, Jun. 17-20, 2008, 13 pages.
Hoffmann et al., "Multilateral Security in Mobile Applications and Location Based Services", retrieved at <<https://users.cs.jmu.edu/bernstdh/web/CS685/papers/hoffman-et-al-2002.pdf>> on May 14, 2008, 18 pages.
Hoh et al., "Virtual Trip Lines for Distributed Privacy-Preserving Traffic Monitoring", Proceedings of the 6th International Conference on Mobile Systems, Applications, and Services, Jun. 17-20, 2008, 14 pages.
Hull et al., "CarTel: A Distributed Mobile Sensor Computing System", Proceedings of the 4th International Conference on Embedded Networked Sensor Systems, Nov. 1-3, 2006, 14 pages.
Jagadeesan et al., "A Novel Approach to Design of User Re-Authentication Systems", Proceedings of the 3rd IEEE International Conference on Biometrics: Theory, Applications and Systems, Sep. 2009, 6 pages.
Kang et al., "A Scalable and Energy-Efficient Context Monitoring Framework for Mobile Personal Sensor Networks", IEEE Transactions on Mobile Computing, vol. 9, No. 5, May 2010, pp. 686-702, 17 pages.
Kharif, Olga, "Parental Controls for Mobile Phones? You Bet", Tech Beat, published Aug. 16, 2005, retrieved at <<http://www.businessweek.com/the_thread/techbeat/archives/2005/08/parental_contro.html>>, 12 pages.
Klosterman et al., "Secure Continuous Biometric-Enhanced Authentication", Technical Report CMU-CS-00-134, School of Computer Science, Carnegie Mellon University, Pittsburgh, PA, May 2000, 25 pages.
Kottahachchi et al., "Access Controls for Intelligent Environments", Proceedings of ISDA '04, 4th Annual International Conference on Intelligent Systems Design and Applications, Budapest, Hungary, 2004, 6 pages.
Krumm et al., "Predestination: Inferring Destinations from Partial Trajectories", UbiComp 2006: The Eighth International Conference on Ubiquitous Computing, Sep. 17-21, 2006, Orange County, CA, 18 pages.
Krumm et al., "RightSPOT: A Novel Sense of Location for a Smart Personal Object", Proceedings of Ubicomp 2003, Oct. 2003, Seattle, WA, 8 pages.

(56) References Cited

OTHER PUBLICATIONS

Kupper et al., "Efficient Proximity and Separation Detection among Mobile Targets for Supporting Location-based Community Services", Mobile Computing and Communications Review, vol. 10, No. 3, Jul. 2006, 12 pages.

Lamarca et al., "Place Lab: Device Positioning Using Radio Beacons in the Wild", International Conference on Pervasive Computing, Feb. 5, 2005, 18 pages.

Leblanc, Brandon, "The Device Experience in Windows 7—Updated", Windows 7 Team Blog, published Sep. 1, 2009, retrieved at <<http://windowsteamblog.com/windows/archive/b/windows7/archive/2009/09/01/thedevice-experience-in-windows-7-updated.aspx>>, 14 pages.

Lester et al., "A Practical Approach to Recognizing Physical Activities", Pervasive Computing, vol. 3968, 2006, 17 pages.

Lester et al. "Validated Caloric Expenditure Estimation using a Single Body-Worn Sensor", Proceedings of the 11th International Conference on Ubiquitous Computing, Sep. 30-Oct. 3, 2009, 10 pages.

Liao et al., "Extracting Places and Activities from GPS Traces Using Hierarchical Conditional Random Fields", The International Journal of Robotics Research, vol. 26, No. 1, Jan. 9, 2007, pp. 119-134, 17 pages.

Lifehacker, "Get the Most Out of Your iPhone's Notification Center, from Beginner to Jailbreaker", published Feb. 7, 2012, retrieved at <<http://lifehacker.com/5882947/get-the-most-out-ofios-Ss-notification-center-frombeginner-to-jailbreaker>> on Jul. 29, 2014, 8 pages.

Lin et al., "Enabling Energy-Efficient and Quality Localization Services", 4th Annual IEEE International Conference on Pervasive Computing and Communications Workshops, Mar. 2006, 4 pages.

Lin et al., "Energy-Accuracy Trade-off for Continuous Mobile Device Location", Proceedings of ACM MobiSys'10, Jun. 15-18, 2010, 13 pages.

Liu et al., "xShare: Supporting Impromptu Sharing of Mobile Phones", MobiSys'09, Jun. 22-25, 2009, pp. 15-28, 14 pages.

Lu et al., "Sound Sense: Scalable Sound Sensing for People-Centric Sensing Applications on Mobile Phones", MobiSys'09, Jun. 22-25, 2009, 14 pages.

McGlaun, Shane, "Fixes for Distracted Driving Remain Unclear", Jun. 12, 2012 Blog, retrieved at <<http://www.dailytech.com/article.aspx?newsid=24903>, 2 pages.

Mohan et al., "Nericell: Rich Monitoring of Road and Traffic Conditions using Mobile Smartphones", SenSys'08, Nov. 5-7, 2008, 14 pages.

Moran et al., "Getting StartED with Windows 7", 2009, Springer-Verlag, 412 pages.

Mui, Chunka, "The Lifesaving Smartphone Feature That We Need: Driving Mode", published Dec. 19, 2011, retrieved at <<http://www.forbes.com/sites/chunkamui/2011/12/19/the-smart-phonefeature-that-we-need-driving-mode/>>, 4 pages.

Nasar et al., "Mobile telephones, distracted attention, and pedestrian safety", Accident Analysis & Prevention, Jan. 2008, pp. 69-75, 7 pages.

Niino, Junichi, "There was free enterprise microblogging, Japanese were developed "youRoom!" Free plan upgrade just mutter", published Dec. 21, 2010, retrieved at <<http://www.publickey1.jp/blog/10/youroom.html>>, 4 pages.

Oliver et al., "HealthGear: A Real-time Wearable System for Monitoring and Analyzing Physiological Signals", International Workshop on Wearable and Implantable Body Sensor Networks, Apr. 3-5, 2006, 4 pages.

Osxdaily, "How to Use the Lock Screen Camera in iOS 5.1", published Mar. 8, 2012, retrieved at <<http://osxdaily.com/2012/03/08/lock-screen-camera-ios-5-1>>, 10 pages.

Paek et al., "Energy-Efficient Rate-Adaptive GPS-based Positioning for Smartphones", MobiSys'10, Jun. 15-18, 2010, 16 pages.

Patten et al., "Using mobile telephones: cognitive workload and attention resource allocation", Accident Analysis and Prevention, May 2004, pp. 341-350, 10 pages.

Peng et al., "BeepBeep: A High Accuracy Acoustic Ranging System Using COTS Mobile Devices", ACM, SenSys 2007, Nov. 6-9, 2007, Sydney, Australia, 14 pages.

Pering et al., "The PSI Board: Realizing a Phone-Centric Body Sensor Network", 4th International Workshop on Wearable and Implantable Body Sensor Networks, 2007, 6 pages.

Person, Jon, "Writing Your Own GPS Applications: Part 2", The Code Project, published Dec. 20, 2004, retrieved at <<http://www.codeproject.com/KB/mobile/WritingGPSApplications2.aspx?display=Print>>, 13 pages.

Quick, Darren, "BizzTrust for Android splits a single smartphone into two virtual phones", published Oct. 10, 2011, retrieved at <<http://www.gizmag.com/bizztrust-for-android/20114/>>, 4 pages.

Raja, Haroon, "How to Replace and Customize Android Lock Screen [Guide]", published Jun. 10, 2011, retrieved at <<http://www.addictivetips.com/mobile/how-to-replace-and-customize-android-lock-screenguide/>>, 14 pages.

Riva et al., "The Urbanet Revolution: Sensor Power to the People!", Pervasive Computing, vol. 6, No. 2, Apr.-Jun. 2007, pp. 41-49, 9 pages.

Ruairi et al., "An Energy-Efficient, Multi-Agent Sensor Network for Detecting Diffuse Events", IJCAI, 2007, pp. 1390-1395, 6 pages.

Saenz, Aaron, "Unlock Your Door With Your Phone, Text a Key to a Friend—Lockitron is Awesome (video)", published May 24, 2011, retrieved at <<http://singularityhub.com/2011/05/24/unlock-your-door-with-your-phone-text-a-key-to-a-friend-lockitron-is-awesome-video/>>, 5 pages.

Samberg, David, "Stay Focused While Driving", published Sep. 13, 2012, retrieved at <<http://www.verizonwireless.com/news/2012/09/safely-go-driving-app.html>>, 4 pages.

Schindler et al., "City-Scale Location Recognition", IEEE Computer Society Conference on Computer Vision and Pattern Recognition (CVPR), Jun. 2007, 7 pages.

Shin et al., "DEAMON: Energy-efficient sensor monitoring", 6th Annual IEEE Communications Society Conference on Sensor, Mesh and Ad Hoc Communications and Networks, Jun. 22, 2009, 9 pages.

Simonite, Tom, "One Smart Phone, Two Personalities", published Oct. 13, 2011, retrieved at <<http://www.technologyreview.com/communications/425741/one-smart-phone-two-personalites/>>, 3 pages.

Smailagic et al., "Location Sensing and Privacy in a Context-Aware Computing Environment", IEEE Wireless Communications, Oct. 2002, pp. 10-17, 8 pages.

Stajano, Frank, "One user, many hats; and, sometimes, no hat-towards a secure yet usable PDA", Security Protocols Workshop, Springer Verlag, Apr. 2004, 14 pages.

Sun et al., "Signal Processing Techniques in Network-Aided Positioning", IEEE Signal Processing Magazine, Jul. 2005, pp. 12-23, 12 pages.

Talbot, David, "App Battles Driver Distraction but Spares Passengers", Technology Review India published by MIT, Feb. 14, 2012, retrieved at <<http://www.technologyreview.in/news/426889/app-battles-driver-distraction-but-spares-passengers/>>, 2 pages.

Temporale, Mike, "Removing Application Lock on Windows Mobile Standard Devices", published Sep. 4, 2009, retrieved at <<http://www.mobilejaw.com/articles/2009/09/removing-application-lock-on-windows-mobile-standard-devices/>>, 10 pages.

Tiemann, Amy, "AT&T adds parental control options to cell phones", CNET News, published Sep. 4, 2007, retrieved at <<http://news.cnet.com/8301-13507_3-9770506-18.html>>, 1 page.

Wang et al., "A Framework of Energy Efficient Mobile Sensing for Automatic User State Recognition", MobiSys'09, Jun. 22-25, 2009, 14 pages.

Warren, Tom, "Microsoft Flaunts Metro style PowerPoint live tiles [video]", WinRumors, published Jul. 11, 2011, retrieved at <<http://www.winrumors.com/microsoft-flaunts-metro-style-powerpoint-live-tiles-video/>>, 12 pages.

Weilenmann et al., "Local use and sharing of mobile phones", B. Brown, N. Green & R. Harper (Eds.) Wireless World: Social and Interactional Aspects of the Mobile Age, Godalming and Hiedleburg: Springer Verlag, 2001, pp. 99-115, 17 pages.

Williams, Harold, "AT&T Drive Mode, The Anti-Texting While Driving Mobile Solution (video)", published Oct. 13, 2011, retrieved

(56) References Cited

OTHER PUBLICATIONS at <<http://www.talkandroid.com/66579-att-drive-mode-the-antitexting-while-driving-mobile-solution-vdeo/>>, 6 pages.
Wood, Molly, "Hey, phone makers: Where's 'driving mode'?", published Apr. 29, 2010, retrieved at <<http://news.cnet.com/8301-31322_3-20003824-256.html>>, 3 pages.
Woodman et al., "Pedestrian Localisation for Indoor Environments", UbiComp'08, Sep. 21-24, 2008, 10 pages.
Youssef et al., "The Horus WLAN Location Determination System", MobiSys'05, Jun. 2005, 14 pages.
Yu et al., "Personalized Awareness and Safety with Mobile Phones as Sources and Sinks", Proceedings of Urbansense, Workshop held in conjunction with SenSys, Nov. 4, 2008, pp. 26-30, 5 pages.
Zaplata et al., "Context-based Cooperation in Mobile Business Environments—Managing the Distributed Execution of Mobile Processes", Business & Information Systems Engineering, Apr. 2009, pp. 301-314, 14 pages.
Zhang et al., "The Two Facets of the Exploration-Exploitation Dilemma", Proceedings of the IEEE/WIC/ACM International Conference on Intelligent Agent Technology (IAT '06), Dec. 2006, 7 pages.
Zhuang et al., "Improving Energy Efficiency of Location Sensing on Smartphones", MobiSys'10, Jun. 15-18, 2010, 15 pages.
Non-Final Office Action dated Mar. 17, 2011 from U.S. Appl. No. 12/194,213, 17 pages.
Final Office Action dated Sep. 20, 2011 from U.S. Appl. No. 12/194,213, 12 pages.
Notice of Allowance and Examiner-Initiated Interview Summary dated Jun. 27, 2012 from U.S. Appl. No. 12/194,213, 25 pages.
Notice of Allowance dated Dec. 21, 2012 from U.S. Appl. No. 12/194,213, 17 pages.
Notice of Allowance dated May 31, 2013 from U.S. Appl. No. 12/194,213, 21 pages.
International Search Report and Written Opinion dated Nov. 18, 2009 from PCT Patent Application No. PCT/US2009/039509, 8 pages.
Extended European Search Report dated Jan. 17, 2013 from European Patent Application No. 09747072.8, 5 pages.
First Office Action dated Dec. 19, 2012 from Chinese Patent Application No. 200980128048.8, 11 pages.
Second Office Action dated May 6, 2013 from Chinese Patent Application No. 200980128048.8, 7 pages.
Third Office Action dated Dec. 2, 2013 from Chinese Patent Application No. 200980128048.8, 7 pages.
Notice on Grant dated Jun. 19, 2014 from Chinese Patent Application No. 200980128048.8, 4 pages.
Non-Final Office Action dated Oct. 3, 2013 from U.S. Appl. No. 13/875,139, 24 pages.
Final Office Action dated May 9, 2014 from U.S. Appl. No. 13/875,139, 20 pages.
Non-Final Office Action dated Oct. 24, 2014 from U.S. Appl. No. 13/875,139, 20 pages.
Notice of Allowance and Examiner-Initiated Interview Summary dated Mar. 5, 2015 from U.S. Appl. No. 13/875,139, 8 pages.
Non-Final Office Action dated Jun. 28, 2011 from U.S. Appl. No. 12/417,752, 19 pages.
Final Office Action dated Sep. 13, 2012 from U.S. Appl. No. 12/417,752, 18 pages.
Non-Final Office Action dated May 24, 2013 from U.S. Appl. No. 12/417,752, 18 pages.
Final Office Action dated Jul. 17, 2013 from U.S. Appl. No. 12/417,752, 18 pages.
Non-Final Office Action dated Oct. 29, 2013 from U.S. Appl. No. 12/417,752, 17 pages.
Final Office Action dated Feb. 25, 2014 from U.S. Appl. No. 12/417,752, 28 pages.
Response filed Aug. 20, 2014 to the Non-Final Office Action dated May 8, 2014 from U.S. Appl. No. 12/897,586, 15 pages.
Notice of Allowance and Examiner-Initiated Interview Summary dated Oct. 15, 2014 from U.S. Appl. No. 12/897,586, 19 pages.
Notice of Allowance dated Mar. 3, 2015 from U.S. Appl. No. 12/897,586, 3 pages.
International Search Report and Written Opinion dated Mar. 26, 2012 from PCT Patent Application No. PCT/US2011/049614, 7 pages.
First Office Action dated Dec. 4, 2013 from Chinese Patent Application No. 201110317851.5, 14 pages.
Second Office Action dated May 8, 2014 from Chinese Patent Application No. 201110317851.5, 10 pages.
Third Office Action dated Nov. 14, 2014 from Chinese Patent Application No. 201110317851.5, 15 pages.
Patent Examination Report No. 1 dated Jun. 20, 2014 from Australian Patent Application No. 2011312743, 4 pages.
Patent Examination Report No. 2 dated Aug. 15, 2014 from Australian Patent Application No. 2011312743, 4 pages.
Notice of Acceptance dated Nov. 25, 2014 from Australian Patent Application No. 2011312743, 2 pages.
Office Action dated Feb. 2, 2015 from Chilean Patent Application No. 201300886, 7 pages.
Supplementary European Search Report dated Apr. 3, 2014 from European Patent Application No. 11831134.9, 3 pages.
Non-Final Office Action dated May 4, 2012 from U.S. Appl. No. 12/912,456, 21 pages.
Non-Final Office Action dated Sep. 11, 2012 from U.S. Appl. No. 12/912,456, 16 pages.
Final Office Action dated Jan. 9, 2013 from U.S. Appl. No. 12/912,456, 21 pages.
Non-Final Office Action dated May 29, 2013 from U.S. Appl. No. 12/912,456, 22 pages.
Final Office Action dated Sep. 6, 2013 from U.S. Appl. No. 12/912,456, 24 pages.
Notice of Allowance dated Jan. 7, 2014 from U.S. Appl. No. 12/912,456, 9 pages.
Non-Final Office Action dated Apr. 26, 2013 from U.S. Appl. No. 13/090,474, 29 pages.
Final Office Action dated Nov. 21, 2013 from U.S. Appl. No. 13/090,474, 36 pages.
Non-Final Office Action dated May 6, 2014 from U.S. Appl. No. 13/090,474, 39 pages.
Final Office Action dated Nov. 25, 2014 from U.S. Appl. No. 13/090,474, 45 pages.
International Search Report and Written Opinion dated Oct. 12, 2012 from PCT Patent Application No. PCT/US2012/034598, 9 pages.
Non-Final Office Action dated Feb. 14, 2013 from U.S. Appl. No. 13/222,538, 37 pages.
Final Office Action dated May 28, 2013 from U.S. Appl. No. 13/222,538, 44 pages.
Non-Final Office Action dated Oct. 11, 2013 from U.S. Appl. No. 13/222,538, 39 pages.
Non-Final Office Action dated Aug. 6, 2013 from U.S. Appl. No. 13/328,312, 34 pages.
Non-Final Office Action dated Jun. 24, 2014 from U.S. Appl. No. 13/726,027, 41 pages.
Final Office Action dated Jan. 5, 2015 from U.S. Appl. No. 13/726,027, 23 pages.
International Search Report and Written Opinion dated Apr. 29, 2013 from PCT Patent Application No. PCT/US2012/071546, 10 pages.
Supplementary European Search Report dated Apr. 30, 2015 from European Patent Application No. 12859972.7, 3 pages.
Non-Final Office Action dated Feb. 12, 2015 from U.S. Appl. No. 13/726,092, 53 pages.
International Search Report and Written Opinion dated Apr. 25, 2013 from PCT Patent Application No. PCT/US2012/071555, 9 pages.
Non-Final Office Action dated Mar. 18, 2014 from U.S. Appl. No. 13/726,099, 20 pages.
Final Office Action dated Aug. 29, 2014 from U.S. Appl. No. 13/726,099, 25 pages.
Non-Final Office Action dated Jan. 7, 2015 from U.S. Appl. No. 13/726,099, 14 pages.

(56) References Cited

OTHER PUBLICATIONS

Final Office Action dated May 8, 2015 from U.S. Appl. No. 13/726,099, 14 pages.
International Search Report and Written Opinion dated Mar. 28, 2013 from PCT Patent Application No. PCT/US2012/071557, 9 pages.
Supplementary European Search Report dated Jan. 23, 2015 from European Patent Application No. 12859485.0, 4 pages.
Examination Report dated Feb. 12, 2015 from European Patent Application No. 12859485.0, 5 pages.
Appeal Brief and Terminal Disclaimer filed Aug. 30, 2016 from U.S. Appl. No. 14/686,300, 34 pages.
Terminal Disclaimer Decision mailed Aug. 30, 2016 from U.S. Appl. No. 14/686,300, 1 page.
Non-Final Office Action dated Jun. 24, 2014 from U.S. Appl. No. 13/726,090, 50 pages.
Final Office Action dated Oct. 2, 2014 from U.S. Appl. No. 13/726,090, 33 pages.
International Search Report and Written Opinion dated Mar. 28, 2013 from PCT Patent Application No. PCT/US2012/071559, 10 pages.
Non-Final Office Action dated Jan. 28, 2015 from U.S. Appl. No. 13/726,040, 42 pages.
Restriction Requirement dated Jul. 1, 2014 from U.S. Appl. No. 13/726,049, 25 pages.
Non-Final Office Action dated Dec. 4, 2014 from U.S. Appl. No. 13/726,049, 15 pages.
Restriction Requirement dated Jun. 20, 2014 from U.S. Appl. No. 13/726,048, 24 pages.
Non-Final Office Action dated Dec. 9, 2014 from U.S. Appl. No. 13/726,048, 18 pages.
International Search Report and Written Opinion dated Nov. 8, 2013 from PCT Patent Application No. PCT/US2013/050963, 14 pages.
Non-Final Office Action dated Aug. 15, 2014 from U.S. Appl. No. 13/726,095, 41 pages.
Non-Final Office Action dated Jan. 5, 2015 from U.S. Appl. No. 13/726,095, 16 pages.
Final Office Action dated May 8, 2015 from U.S. Appl. No. 13/726,095, 16 pages.
International Search Report and Written Opinion dated Apr. 24, 2013 from PCT Patent Application No. PCT/US2012/071562, 9 pages.
Restriction Requirement dated Mar. 21, 2014 from U.S. Appl. No. 13/726,097, 7 pages.
Notice of Allowance dated Jun. 10, 2014 from U.S. Appl. No. 13/726,097, 31 pages.
Corrected Notice of Allowance dated Aug. 21, 2014 from U.S. Appl. No. 13/726,097, 4 pages.
Corrected Notice of Allowance dated Oct. 1, 2014 from U.S. Appl. No. 13/726,097, 3 pages.
International Search Report and Written Opinion dated Mar. 28, 2013 from PCT Patent Application No. PCT/US2012/071545, 9 pages.
Supplementary European Search Report dated Jan. 5, 2015 from European Patent Application No. 12860631.6, 3 pages.
Examination Report dated Feb. 16, 2015 from European Patent Application No. 12860631.6, 5 pages.
Notice of Allowance dated Jul. 11, 2016 from U.S. Appl. No. 14/495,418, 18 pages.
Corrected Notice of Allowability dated Aug. 12, 2016 from U.S. Appl. No. 14/495,418, 6 pages.
Second Office Action dated Aug. 25, 2016 from Chinese Patent Application No. 201380038072.9, 9 pages.
Second Office Action dated Sep. 29, 2016 from Chinese Patent Application No. 201280004066.6, 6 pages.
Communication pursuant to Rules 70(2) and 70a(2) EPC mailed May 11, 2016 from European Patent Application No. 12883789.5, 1 page.
Response filed Nov. 16, 2016 to the Communication pursuant to Rules 70(2) and 70a(2) EPC mailed May 11, 2016 from European Patent Application No. 12883789.5, 13 pages.
Non-Final Office Action dated Jul. 27, 2016 from U.S. Appl. No. 15/143,731, 95 pages.
Terminal Disclaimer and Response filed Oct. 25, 2016 to the Non-Final Office Action dated Jul. 27, 2016 from U.S. Appl. No. 15/143,731, 10 pages.
Terminal Disclaimer Decision dated Oct. 25, 2016 from U.S. Appl. No. 15/143,731, 1 page.
U.S. Appl. No. 61/580,119 titled "Mobile Device Check-In," filed Dec. 23, 2011 by inventors Joseph H. Matthews et al., 19 pages.
Applicant-Initiated Interview Summary dated Apr. 29, 2014 from U.S. Appl. No. 13/726,099, 3 pages.
Response filed Jun. 24, 2014 to the Non-Final Office Action dated Mar. 18, 2014 from U.S. Appl. No. 13/726,099, 10 pages.
Response filed Dec. 19, 2014 to the Final Office Action dated Aug. 29, 2014 from U.S. Appl. No. 13/726,099, 13 pages.
Applicant Initiated Interview Summary dated Dec. 19, 2014 from U.S. Appl. No. 13/726,099, 3 pages.
Response filed Mar. 1, 2013 to the Non-Final Office Action dated Feb. 14, 2013 from U.S. Appl. No. 13/222,538, 24 pages.
Response filed Jul. 8, 2013 to the Final Office Action dated May 28, 2013 from U.S. Appl. No. 13/222,538, 33 pages.
Response filed Nov. 21, 2013 to the Non-Final Office Action dated Oct. 11, 2013 from U.S. Appl. No. 13/222,538, 29 pages.
Final Office Action dated Jan. 27, 2014 from U.S. Appl. No. 13/222,538, 40 pages.
Response filed Mar. 22, 2014 to the Final Office Action dated Jan. 27, 2014 from U.S. Appl. No. 13/222,538, 35 pages.
Applicant Summary of Interview dated May 1, 2014 from U.S. Appl. No. 13/222,538, 2 pages.
Notice of Allowance and Examiner-Initiated Interview Summary dated May 12, 2014 from U.S. Appl. No. 13/222,538, 13 pages.
Response filed Nov. 1, 2013 to the Non-Final Office Action dated Aug. 6, 2013 from U.S. Appl. No. 13/328,312, 23 pages.
Notice of Allowance dated Jan. 2, 2014 from U.S. Appl. No. 13/328,312, 12 pages.
Supplemental Amendment, Pre-Appeal Brief Request, and Notice of Appeal filed Jun. 24, 2016 from U.S. Appl. No. 13/726,031, 18 pages.
Advisory Action dated Jul. 14, 2016 from U.S. Appl. No. 13/726,031, 3 pages.
Pre-Brief Appeal Conference Decision dated Jul. 15, 2016 from U.S. Appl. No. 13/726,031, 3 pages.
Appeal Brief filed Aug. 24, 2016 from U.S. Appl. No. 13/726,031, 43 pages.
"XP User to Windows 7", Retrieved From <<http://download.Microsoft.com/download/A/0/D/A0D4CF2B-9B70-4846- A18D-0765D1F75343/XPUsertoWindows7.pdf>>, Jun. 13, 2010, 9 pages. (No English Translation).
Hayama, Hiroshi et al., Dekiru Daijiten Windows Vista Home premium / Home Basic / Business (First Edition), Tokyo, Japan, Impress Japan Corporation, Mar. 21, 2007, pp. 748-776, 33 pages. (No English Translation).
Notice of Allowance dated May 19, 2017 from U.S. Appl. No. 13/726,043, 25 pages.
Advisory Action, Examiner-Initiated Interview Summary, and After Final Consideration Program Decision dated Apr. 24, 2017 from U.S. Appl. No. 14/746,763, 5 pages.
"Amendment Filed in Chile Patent Application No. 886-2013", Filed Date: Apr. 10, 2015, 15 Pages.
"Amendment Filed in Chile Patent Application No. 886-2013", Filed Date: Aug. 6, 2015, 6 Pages.
"Notice of Allowance Issued in Japanese Application No. 2013-532806", dated Oct. 2, 2015, 4 Pages.
"Notice of Allowance Issued in Chinese Application No. 201280064066.6", dated Mar. 7, 2017, 4 Pages.
Office Action Issued in Taiwan Patent Application No. 102127829, dated Nov. 14, 2016, 9 Pages.
Notice of Allowance dated Nov. 7, 2016 from Japanese Patent Application No. 2015-529778, 4 pages.

(56) References Cited

OTHER PUBLICATIONS

Notice of Allowance dated Apr. 27, 2017 from U.S. Appl. No. 15/143,731, 55 pages.
Corrected Notice of Allowability dated May 12, 2017 from U.S. Appl. No. 15/143,731, 7 pages.
Summons to Attend Oral Proceedings Issued in EP Patent Application No. 12859485.0, dated Jul. 4, 2016, 12 Pages.
"Non-Final Office Action Issued in U.S. Appl. No. 13/090,474", dated Apr. 8, 2015, 12 Pages.
Non-Final Office Action Issued in U.S. Appl. No. 13/090,474,, dated Dec. 3, 2015, 14 Pages.
Final Office Action Issued in U.S. Appl. No. 13/726,099, dated Dec. 22, 2016, 14 Pages.
Response Filed in U.S. Appl. No. 13/726,099, filed Jul. 30, 2013, 2 Pages.
Notice of Allowance Issued in U.S. Appl. No. 14/686,300, dated Jan. 13, 2017, 12 Pages.
Notice of Appeal Filed in U.S. Appl. No. 14/686,300, filed Jun. 30, 2016, 2 Pages.
"First Office Action and Search Report Issued in Chinese Patent Application No. 201280063918.X", dated Mar. 20, 2017, 13 Pages.
Office Action Issued in Japanese Patent Application No. 2014-548998, dated Dec. 13, 2016, 10 Pages.
Notice of Allowance and Examiner-Initiated Interview Summary dated Mar. 17, 2017 from U.S. Appl. No. 13/726,043, 95 pages.
Final Office Action dated Jan. 17, 2017 from U.S. Appl. No. 14/746,763, 16 pages.
After Final Consideration Pilot Program Request filed Mar. 24, 2017 with Response to the Final Office Action dated Jan. 17, 2017 from U.S. Appl. No. 14/746,763, 11 pages.
Terminal Disclaimer filed Apr. 3, 2017 from U.S. Appl. No. 14/746,763, 4 pages.
Terminal Disclaimer Decision dated Apr. 5, 2017 from U.S. Appl. No. 14/746,763, 5 pages.
Examiner's Answer dated Dec. 30, 2016 to the Appeal Brief filed Aug. 24, 2016 from U.S. Appl. No. 13/726,031, 9 pages.
Reply Brief filed Feb. 28, 2017 from U.S. Appl. No. 13/726,031, 12 pages.
Non-Final Office Action dated Nov. 14, 2016 from U.S. Appl. No. 15/071,960, 67 pages.
Response filed Feb. 14, 2017 to the Non-Final Office Action dated Nov. 14, 2016 from U.S. Appl. No. 15/071,960, 21 pages.
Notice of Allowance dated Mar. 6, 2017 from U.S. Appl. No. 15/071,960, 12 pages.
Final Office Action dated Dec. 16, 2016 from U.S. Appl. No. 13/726,090, 32 pages.
Preliminary Amendment filed Mar. 24, 2017 from U.S. Appl. No. 15/233,699, 8 pages.
Response filed Oct. 25, 2016 to the Non-Final Office Action dated Jul. 27, 2016 from U.S. Appl. No. 15/143,731, 7 pages.
Non-Final Office Action dated Dec. 7, 2016 from U.S. Appl. No. 15/143,731, 14 pages.
Response filed Mar. 7, 2017 to the Non-Final Office Action dated Dec. 7, 2016 from U.S. Appl. No. 15/143,731, 6 pages.

Decision on Appeal dated Jun. 2, 2014 from U.S. Appl. No. 11/345,010, First Named Inventor: Cutlip, 13 pages.
Decision on Appeal dated Nov. 9, 2017 from U.S. Appl. No. 13/726,031, 8 pages.
"BroadCloud FamilyCenter", Retrieved From: https://www.broadsoft.com/news/broadsoft-introduces-broadcloud/, Dec. 13, 2011, 1 Page.
"List of Users in Login Screen", Retrieved From: http://superuser.com/questions/354856/how-can-i-see-a-list-of-all-users-on-the-logon-screen, Dec. 4, 2014, 2 Pages.
"Restrict Access to Programs With AppLocker in Windows 7", Retrieved From: http://www.howtogeek.com/howto/6317/block-users-from-using-certain-applications-with-applocker/, Dec. 13, 2014, 8 Pages.
"Timeline of Microsoft Windows", Retrieved From: https://en.wikipedia.org/wiki/Timeline_of_Microsoft_Windows, 5 Pages.
"Office Action Issued in Korean Patent Application No. 10-2014-7020747", dated Mar. 2, 2018, 8 Pages.
"Office Action Issued in European Patent Application No. 12860373.5", dated May 30, 2018, 5 Pages.
"Office Action Issued in European Patent Application No. 12883789.5", dated Aug. 29, 2017, 5 Pages.
"Final Office Action Issued in U.S. Appl. No. 13/726,040", dated Dec. 1, 2015, 18 Pages.
"Non-Final Office Action Issued in U.S. Appl. No. 13/726,040", dated Aug. 25, 2015, 16 Pages.
"Office Action Issued in Chinese Patent Application No. 201280063918.X", dated Aug. 18, 2017, 6 Pages.
"First Office Action and Search Report Issued in Chinese Patent Application No. 201280063957.X", dated Mar. 22, 2017, 12 Pages.
"Office Action Issued in Chinese Patent Application No. 201280063957.X", dated Nov. 17, 2017, 11 Pages.
"First Office Action and Search Report Issued in Chinese Patent Application No. 201280064052.4", dated Feb. 21, 2017, 13 Pages.
"Office Action Issued in Chinese Patent Application No. 201280064075.5", dated Feb. 28, 2017, 13 Pages.
"Office Action Issued in Chinese Patent Application No. 201280070561.8", dated May 4, 2017, 13 Pages.
"Office Action Issued in Chinese Patent Application No. 201280075512.3", dated Oct. 11, 2017, 11 Pages.
"Office Action Issued in Chinese Patent Application No. 201280075512.3", dated Apr. 3, 2018, 6 Pages.
"Search Report Issued in Chinese Patent Application No. 2012800755123", dated Sep. 27, 2017, 3 Pages.
"Office Action Issued in Japanese Patent application No. 2014-548998", dated Aug. 29, 2017, 6 Pages.
"Office Action Issued in Japanese Patent Application No. 2017-047278", dated May 29, 2018, 10 Pages.
"Office Action Issued in Israel Patent Application No. 2218582", dated Aug. 13, 2015, 6 Pages.
"Office Action Issued in Korean Patent Application No. 10-2014-7020747", dated Sep. 21, 2018, 6 Pages.
"Office Action in Issued in Korean Patent Application No. 10-2014-7020747", dated Nov. 29, 2018, 7 Pages.
"Office Action Issued in Korean Patent Application No. 10-2015-7005015", dated Dec. 9, 2018, 11 Pages.

* cited by examiner

HUB KEY SERVICE

RELATED APPLICATION

This application claims priority under 35 U.S.C. Section 119(e) to U.S. Provisional Application Ser. No. 61/580,143 filed Dec. 23, 2011 entitled "Mobile Devices Hub Coordination", the disclosure of which is incorporated by reference herein in its entirety.

BACKGROUND

Many types of devices, such as mobile phones, tablet devices, and other computing, communication, and entertainment devices increasingly offer more functions, applications, and features which are beneficial to a user, and can enhance one's personal time as well as work and social activities. For example, not only can a mobile phone be used for text, email, and voice communications, but may also be used for entertainment, such as to listen to music, surf the Internet, watch video content, gaming, and for photo and video imaging. Similarly, a portable tablet device may be utilized for email, browser, navigation, and other computing applications, as well as for the various entertainment and photo features.

SUMMARY

This Summary introduces simplified concepts of a hub key service for coordinated access, such as via mobile devices, and the concepts are further described below in the Detailed Description and/or shown in the Figures. This Summary should not be considered to describe essential features of the claimed subject matter, nor used to determine or limit the scope of the claimed subject matter.

In embodiments, a device includes a communication interface for communication coordination with one or more associated devices of the device, and the associated devices correspond to hub members. A hub manager is implemented to generate an electronic key that includes access permissions, which are configurable to enable controlled access for the hub members, such as to a building or vehicle. The hub manager can then correlate the electronic key with the device to enable access to the building or vehicle with the device utilized as the electronic key.

In embodiments, the hub manager can correlate the electronic key with an associated device to enable hub member access, such as to the building or vehicle, with the associated device utilized as the electronic key. An electronic key can be implemented for controlled access to a building, home, a vehicle, a media device or location (e.g., television, computer, television channels, on-line content store, etc.) or any other type of access controlled location or device. The hub manager can modify the access permissions of the electronic key to restrict a hub member access, such as to the building or vehicle, with the associated device utilized as the electronic key. The hub manager can also be implemented to modify the access permissions of the electronic key to limit hub member access to the vehicle after a designated time of day; monitor use of the vehicle when the device is utilized as the electronic key; and/or monitor entry and exit accesses to the building when the device is utilized as the electronic key.

In embodiments, the hub manager can receive a user input to enable a non-hub member access to a building, and initiate unlocking the building utilizing the electronic key communicated from the device. The hub manager can also change the electronic key to a different electronic key, correlate the different electronic key with the device to enable access with the device utilized as the different electronic key, and communicate the different electronic key to the associated devices to replace the electronic key.

In other embodiments, a hub system includes a network service (e.g., a network of one or more server devices) that executes computer instructions as a hub manager. The hub manager is implemented to generate an electronic key that includes access permissions configurable to enable controlled access for one or more hub members to a building, a vehicle, and/or a media device or location. The hub manager can correlate the electronic key with associated devices of the one or more hub members to enable access, such as to the building, vehicle, or media device with an associated device utilized as the electronic key. The hub manager can then determine the associated devices based on identifiers of the associated devices, and communicate the electronic key to the associated devices of the hub members.

BRIEF DESCRIPTION OF THE DRAWINGS

Embodiments of a hub key service for coordinated access are described with reference to the following Figures. The same numbers may be used throughout to reference like features and components that are shown in the Figures.

DETAILED DESCRIPTION

Coordinated access techniques are described. In one or more example, techniques involving a hub are described that support communication between members of the hub to share content. A hub, for instance, may be specified for a family and thus family members may join the hub to share content, such as messages, photos, and so on. A variety of other hubs may also be configured, such as for employees, friends, and so on. Thus, sharing of content may be performed to members of the hub as a whole instead of involving individual communications are previously required using conventional techniques.

The hub may be utilized to support a wide variety of functionality. One example of this functionality is to coordinate access through use of the hub. For example, the hub may be utilized to support access to keys that may be stored locally on a member's mobile phone. These keys may be used for a variety of different purposes, such as for authentication, to access a vehicle or premises, and so on. Accordingly, the hub may support techniques usable to coordinate key dissemination and usage. Further discussion of these and other techniques may be found in relation to the following sections.

While features and concepts of a hub key service for coordinated access can be implemented in any number of different devices, systems, networks, environments, and/or configurations, embodiments of a hub key service are described in the context of the following example devices, systems, and methods.

Example Environment

Figure 1:
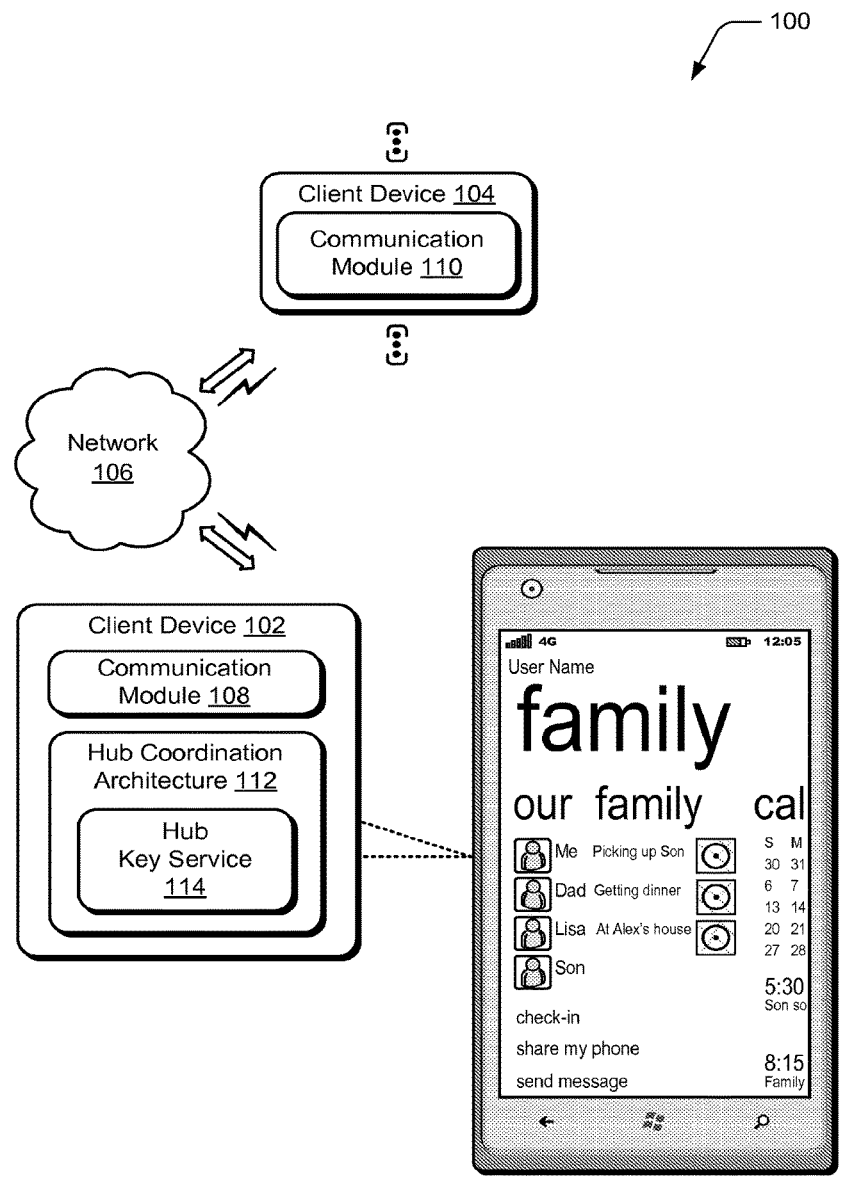
FIG. 1 illustrates an example system in which embodiments of a hub key service via mobile devices can be implemented.

FIG. 1 illustrates an example environment 100 in which various embodiments of a hub key service can be implemented. The example system includes a client device 102 communicatively coupled to another client device 104 via a network. The client devices 102, 104 may be configured according to a variety of different computing device configurations. In the illustrated example, the client device 102 is configured as a mobile device, such as a mobile phone 104 although other mobile device configurations are also contemplated, such as a tablet device, communication device, convertible device, entertainment, gaming, navigation, and/or other type of portable electronic device. The client devices 102, 104 may also assume a variety of other computing device configurations, such as traditional PCs, laptops, and so on. Although a single instance of the client device 104 is illustrated, this device may be representative of a plurality of different devices and thus reference in the following discussion may be made to client device 104 in single or in plural form. Additional examples of functionality that may be incorporated as part of the client device 102, 104 may be found later in the discussion.

The client devices 102, 104 are illustrated as including respective communication modules 108, 110. The communication modules 108, 110 are representative of functionality of the devices to communicate via the network 106, such as to communicate with each other. The communication modules 108, 110 may perform this communication using a variety of techniques, such as to support voice and data communication, text messaging (e.g., SMS, MMS), instant messaging, communication via a social network service, email, and so on. Accordingly, the client device 102, 104 may utilize a variety of different techniques to communicate with each other.

The client device 102 is also illustrated as supporting a hub coordination architecture 112. The hub coordination architecture 112 is representative of functionality to provide a hub that supports communication between members of the hub to share data. The hub, for instance, may include a user interface via which users of the client device 102, 104 may share content based on membership to the hub. Accordingly, the membership may act to support permissions on content between the users of the hub based on membership to the hub. A variety of different content may be shared via the hub, such as messaging, photos, videos, links, background image of the hub, and so on.

Designated member relationships can be utilized to define how the data and information is managed in relation to the hub, and can be implemented to leverage the social contract embodied in the hub. In embodiments, the hub is implemented by the hub coordination architecture 112 as a user interface and/or a client device application for integration and aggregation of the hub-orientated communications, activities, and information. A hub can be implemented as a private, shared space that is limited to access by defined members of the hub. The hub, for instance, may contain links to other members' profiles, and based on restriction settings, allows aggregation for visibility of some of other members' data and information within the hub, and so on. The hub may also be configured to share a group calendar which can be viewed and edited, a common text message window, a posting board, a shared photo album, a check-in feature, and any other type of shared information as further described as follows and show in relation to FIG. 2.

An example of this functionality is illustrated in FIG. 1 as a hub key service 114. The hub key service 114 is representative of functionality to coordinate dissemination and usage of keys and well as tasks to be performed using the keys. For example, the hub key service 114 may be implemented to maintain keys that are usable to gain access to premises, funds maintained within an "eWallet," and so on as well as to manage usage of the keys. This may include management of the keys for access to other hub members as well as management in relation to non-hub members. For example, coordinated access scenarios are contemplated in which a "one off" situation may be supported to grant access to keys for a limited time to another user that is not a member of a hub with the user that is granting the access. Further discussion of these and other techniques may be found beginning in relation to FIG. 3.

Figure 2:
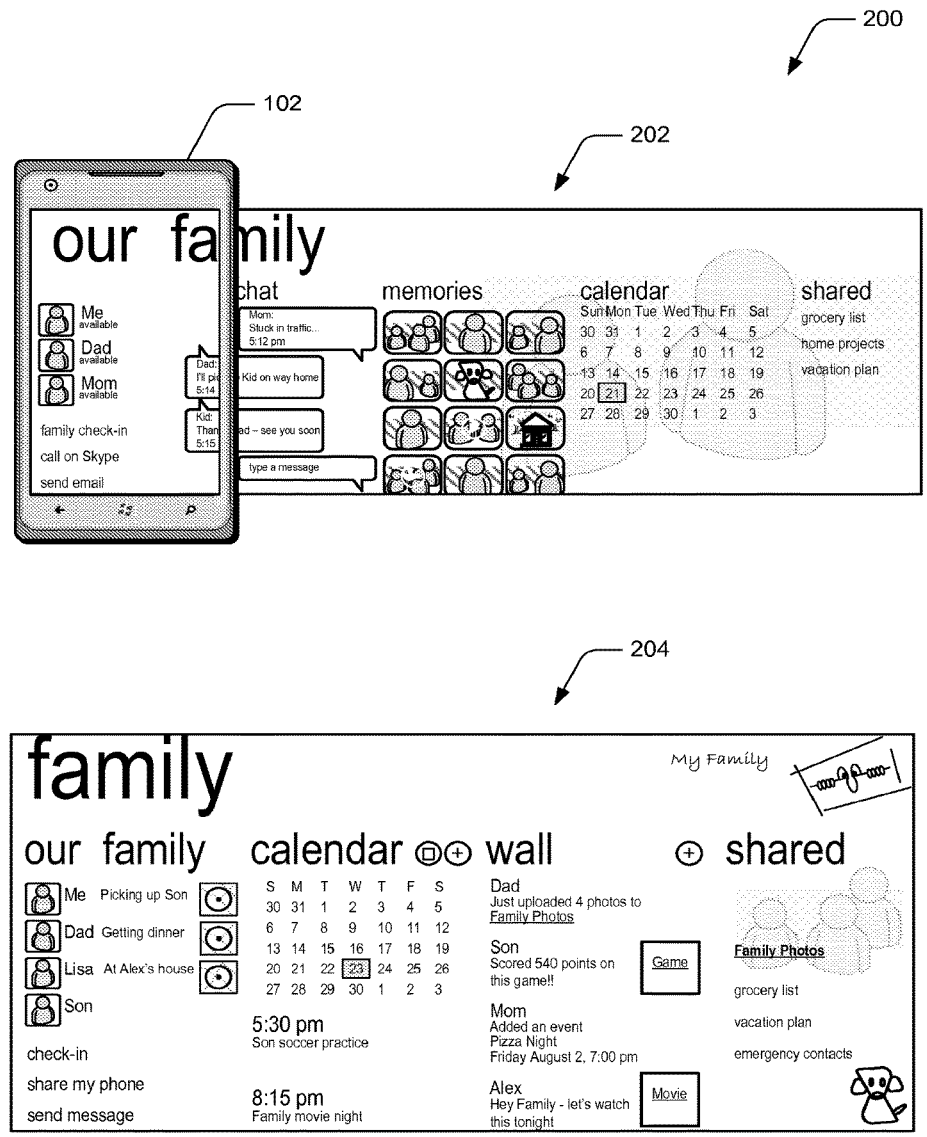
FIG. 2 is an example of a system showing two different examples of hubs for a family.

FIG. 2 is an example of a system 200 showing two different examples of hub user interfaces for a family-orientated hub. The description, layout, orientation, features, and organization of the text, images, photos, graphics, links, data, information, and presentation features shown with reference to the hub user interfaces, as well as with reference to any other user interfaces described herein and/or shown in the figures, are merely examples that may be altered in any aspect for various embodiments and/or implementations of a hub key service.

The hub is a central space for membership-orientated coordination of communications, activities, information, and integration. Designated member relationships can be utilized to define how the data and information is managed, and can be implemented to leverage the social contract, such as between members of a defined familial group in the illustrated example. In one or more implementations, the hub is implemented as a user interface (e.g., via a client device application) for integration and aggregation of the membership-orientated communications, activities, and information. A hub can be implemented as a private, shared space between defined members. The hub contains links to other members' profiles, and based on restriction settings, allows aggregation for visibility of some of other members' data and information within the hub. The hub may share a group calendar which can be viewed and edited, a common text message window, a posting board, a shared photo album, a check-in feature, and any other type of shared information.

Devices and/or device accounts can be associated within a set of devices or device accounts (e.g., a family phone account, user accounts, a connected set of devices, and so on), and all or a subset of the devices or accounts can communicate with other devices or accounts. The members of a hub can be defined by any number of different classes of people, such as Junior, Teen, Mom, Dad, (or Parent), Grandparent, Nanny, Life-Coach, and so on for the illustrated example of a family. Further, the members of a family can be defined to distinguish a live-in Nanny from a Babysitter, for example.

Additionally, membership of the hub as well as use of the hub by the members can be controlled by a select collection of users, such as one or two mobile phones by the associated users of the client devices. For example, one of the members in the hub can be the designated control person, such as a Mom who runs the household, an employer, and so on.

From a single configuration of the members, the hub can be provisioned, setup, and propagated out, e.g., automatically. The features and configuration of a hub may default to an automatic, easy setup, but any rule, feature, or configuration aspect can be readily modified by a user. Provisioning a hub may be based on billing, e.g., a family billing plan. However, if a phone device is changed to a different carrier, for example, the phone device can still receive texts related to the hub. Alternatively or in addition, provisioning a hub can be based on email addresses, phone numbers, user account identifiers, or any other identifier.

A retail person selling a new phone package, for instance, can easily identify the members each to their new phone devices and initiate the hub being instantiated. From a consumer perspective, it just works and members can walk out of the store all set up. All of the data and information can be shared with a single selection, and thus the members do not have to share each item (e.g., a grocery list, photos, calendar, etc.) individually and separately.

The hub user interface may act as a shared space that is customizable and provides for user-generated and shared content. Some information can be shared, while other information is not. For example, Mom's complete Christmas list is not viewable by the other family members, but Dad and Kids can add to the list (and only view their contribution). Hub setup may be performed "a la carte," meaning only the features that members want displayed on the hub wall can be selected. For example, Mom wants to see the shopping list, whereas Dad does not shop and so wants to avoid having the list displayed on his device, yet he could still access the shopping list to add items when desired.

The hub user interface integrates functions, calendar functionality, event and/or data summaries (i.e., on the "wall"), as well as content that is shared between the members of the hub (e.g., lists, documents, etc.). For example, the hub user interface may include a "family check-in" or "check-in" option. The hub user interface may also include a chat section where location check-ins messaged are displayed along with other messages interchanged between the members of the hub. The hub "wall" is representative of an area via which members of the group may add to as desired, like a lunchroom bulletin board, family refrigerator, and so on. In implementations, the information can be aggregated in pillars or columns and shown on the hub wall as illustrated. The hub wall can also represent an interrelation between any of the information and data that appears on the wall and its placement in time. The hub settings provide that a user can control which functions are integrated and displayed within the hub, such as on the wall.

The hub information may also be context relevant to the members of the hub, and the calendar includes shared hub events. Calendar updates can be posted as notice events on the wall, and a user can look at the wall to see upcoming hub events, or the events that pertain to one or more other members of the hub. Messaging may also be performed that is private among the members of the hub. A member can instant text (or other communication) to all other members in the hub. Texting—such as for a work meeting—can divide each members' display on their respective devices into individual screens for each member.

The hub may also be extensible, and may link to a hard drive on a home computer, or sync to just one of the other devices, the manager, or cloud control (e.g., from a network-based service). The hub may also be extensible to third parties that add a note on the hub wall, such as implemented with application program interfaces (APIs) for functions to post data to the hub. A third-party application, however, would not have access to the context of the hub wall, such as to obtain or display hub data. In certain embodiments, the private information and hub data could be encrypted and only decrypted by the phone devices that are associated with the hub.

Thus, the hub supported by the hub coordination architecture 112 may be thought of as a central space for coordination of communications, activities, information, and integration of members of the hub. Hubs may be defined to support a variety of different membership, such as for family members, coworkers, friends, acquaintances, fan clubs, and so forth. Therefore, although examples are discuss that relate to a family in the following discussion it should be readily apparent that membership in the hub may be defined in a variety of other ways without departing from the spirit and scope thereof. Accordingly, the hub coordination architecture 112 may be used to support a variety of different functionality. An example of this functionality is illustrated as a hub key service 114 as further described below and shown in relation to the corresponding figure. Further aspects of hubs are also described further herein.

Figure 3:
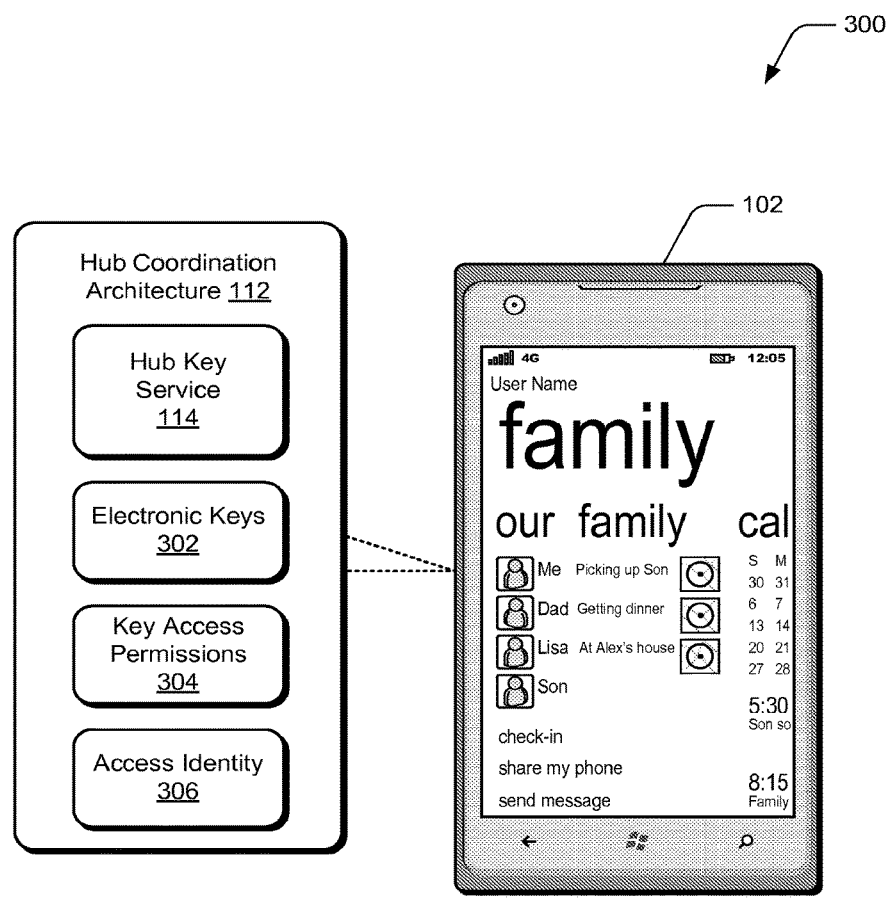
FIG. 3 depicts a system showing a hub key service of FIG. 1 in greater detail.

FIG. 3 depicts a system 300 showing the hub coordination architecture 112 in greater detail. As previously described, the hub coordination architecture 112 may be implemented to support a variety of functionality. Examples of this functionality are illustrated as being implemented by a hub key service 114.

The hub coordination architecture 112 is implemented to manage a hub that is a private, shared space of the hub members. In embodiments, the hub key service 114 can generate electronic keys 302 that include key access permissions 304 configurable to enable controlled access for hub members to a building, vehicle, media device, or any other content, location, device, or repository which may be accessed by using an electronic key. An electronic key can be implemented for controlled access to any type of building, home, vehicle, media device or location (e.g., television, computer, television channels, on-line content store, etc.) or any other type of access controlled location or device. Other types of access-controlled locations or devices may include rooms in house or building, a safe, or any other type of cabinet that may have a lock that is controllable, such as with near-field communication (NFC) or other types of wireless communication.

The hub key service 114 can correlate an electronic key 302 to enable access to a building (e.g., house, work, etc.), vehicle, media device, or any other location or device with the mobile device utilized as the electronic key. The hub key service 114 can be utilized as an access identity 306 that is associated with the electronic key for controlled access. Additionally, an electronic key can be implemented with a corresponding device PIN (personal identification number) or passcode so that the mobile device may not be used as the electronic key without first entering the PIN or passcode to access the device.

The hub key service 114 can also correlate an electronic key 302 with an associated device to enable hub member access to a building, vehicle, media device, or any other location or device with the associated device utilized as the electronic key. In embodiments, the hub key service 114 can modify the access permissions 304 of an electronic key 302 to restrict hub member access, such as to a building or vehicle, with an associated device utilized as the electronic key. The hub manager can also modify the access permissions of an electronic key to limit hub member access to a building or a vehicle after a designated time of day or for a specific time window. For example, an electronic key can be set as a variable time lock, such as to limit access to a vehicle after a designated time in the evening. The hub manager can also monitor use of the vehicle when the device is utilized as the electronic key, and/or monitor entry and exit accesses to a building when the device is utilized as the electronic key.

In embodiments, the hub key service 114 can receive a user input at the client device 102 to enable a non-hub member access to a building or vehicle, and communicate the electronic key from the device to initiate unlocking the building. For example, a user of the client device 102 can initiate unlocking his or her front door to accommodate a delivery or service person access to the residence. The hub manager may also change the electronic key to a different electronic key, such as to "change the locks". The different or changed electronic key can be correlated with the mobile device to enable access to the building, vehicle, or media device with the mobile device utilized as the different electronic key. Additionally, the different electronic key can be communicated to the associated devices to replace the electronic key for hub members.

Figure 4:
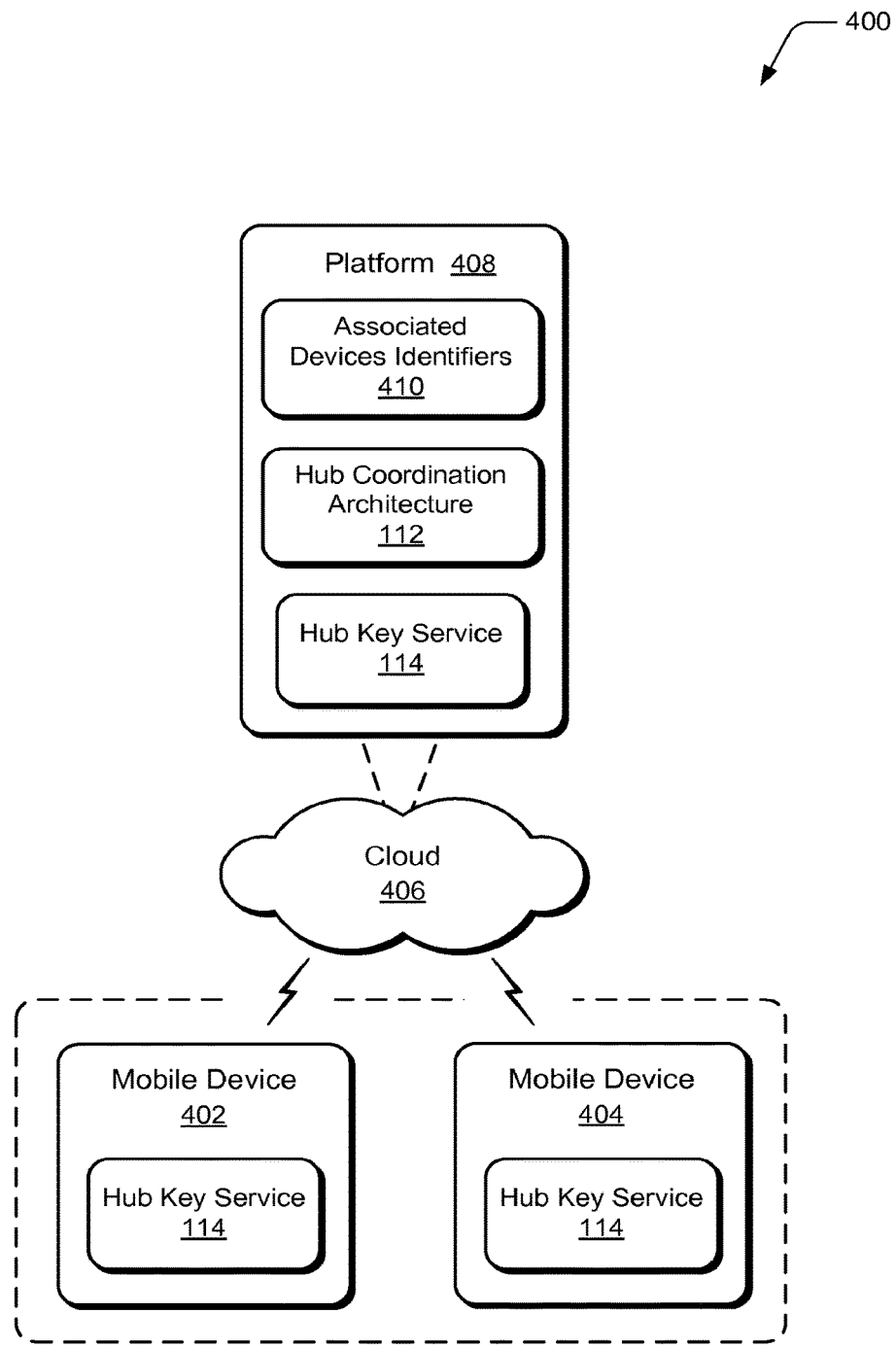
FIG. 4 illustrates an example system that includes mobile devices that are examples of the client device as described with reference to the previous FIGS. 1-3.

FIG. 4 illustrates an example system 400 that includes mobile devices 402 and 404 that are examples of the client device 102 as described with reference to the previous FIGS. 1-3. In embodiments, the mobile devices 402 and 404 can each be associated with a different user, and the users are defined members of the hub as illustrated by a dashed line, which may include two or more associated devices. The mobile devices each include an implementation of the hub key service 114 as described with reference to the previous FIGS. 1-3 to manage electronic keys 302 (also referred to herein as the keys or hub keys for associated devices of one or more hub members). In the example system 400, multiple devices can be interconnected through a central computing device or system, which may be local to the multiple devices or may be located remotely from the multiple devices. Alternatively, or in addition, the mobile devices may be inter-connected through a peer-to-peer network using NFC or other peer-to-peer networking techniques.

In embodiments, the central computing device may be a cloud 406 of one or more server computers that are connected to the multiple devices through a network, the Internet, or other data communication link. In embodiments, this interconnection architecture enables functionality across multiple devices to provide a networked service environment of the multiple devices. Each of the devices may have different physical configurations and capabilities, and the central computing device can utilize a platform 408 to maintain the associated devices identifiers 410, and implement the hub key service 114 that manages the electronic keys 302 in embodiments of a hub key service.

The cloud 406 includes and/or is representative of the platform 408 for the networked service components (e.g., the hub key service 114) that implements embodiments of a hub key service. The platform abstracts underlying functionality of hardware, such as server devices, and/or software resources of the cloud. The networked service components may include applications and/or data that can be utilized while computer processing is executed on servers that are remote from the mobile devices 402 and 404.

In embodiments, the hub key service 114 at the platform 408 is implemented to generate an electronic key (e.g., a hub key 302) that includes access permissions configurable to enable controlled access for hub members to a building, vehicle, media device, or any other location or device as described herein. The hub key service 114 can correlate the electronic key with associated devices (e.g., the mobile devices 402 and 404) of the hub members to enable access to the building, vehicle, or media device with an associated device utilized as the electronic key. The hub manager can then determine the associated devices that correspond to the hub members based on the associated devices identifiers 410, and communicate the electronic key 302 to respective associated devices of the hub members that may then utilize an associated device as the electronic key for controlled access.

The hub key service 114 at the platform 408 can also implement any of the embodiments and features of a hub key service as described herein. For example, the hub key service 114 at the platform can modify the access permissions of an electronic key 302 to restrict or limit hub member access to a building, vehicle, or mobile device with an associated device utilized as the electronic key. The hub key service 114 can also be implemented to monitor entry and exit accesses to the building when an associated device is utilized as the electronic key.

The hub key service 114 can also receive a user input from an associated device (e.g., one of the mobile devices 402 and 404) to enable a non-hub member access to the building, and communicate the electronic key to initiate unlocking the building. For example, the hub manager can communicate the electronic key to a device associated with the non-hub member, or to a receiving device at the building that controls on-site building access.

Thus, the electronic keys feature provides that a mobile phone or other portable communication device can be implemented to interrelate with an automobile or building, and give a user the ability to grant or restrict access and/or use of the automobile or building to someone either within the hub group, or outside of the hub group. In embodiments, the electronic keys features can be implemented as a user interface with the hub and/or as a client device application. The electronic keys feature can also be implemented for interaction with application and on-line content stores (e.g., Windows Store, iTunes, etc.). Embodiments of the electronic keys features include any one or combination of implementation features, such as described in the following paragraphs.

Electronic keys provides electronic house and/or vehicle keys, and can be implemented with near field communication (NFC) security or other proximity security in a phone device. In embodiments, the phone is the identity that is associated with the electronic key to a house, building, or vehicle. A parent can unlock a car for someone, or unlock the front door of the house for a child coming home from school, for maid access, or for a delivery person. Electronic keys can also be used to monitor when a child enters and exits the house. A parent can also easily "change the locks" with the electronic keys, and the key codes can be updated on all of the hub members' devices.

The electronic keys can be set as variable time locks, such as to limit access to a vehicle after a designated time in the evening. Alternatively, a hub key may be implemented as a portable permission slip to allow a kid access to a vehicle, television, computer, etc. Electronic keys can be implemented as an intersection of the house and hub. For example, the television may not display some channels or content when only the kids are home, but will allow the channels and/or content to display when a parent is home (presumably monitored by adult).

Electronic keys can also be implemented to provide a kid money on his or her phone with a spending limit and/or a time limit. A parent doesn't have to then transfer money or access cash to give to the kid. This may be incorporated with remote parental approval. Related to electronic keys, people care about the safety and security of their families. In eWallet scenarios, a phone user may have fewer authentication checks for accessing a wallet if the user's phone is connected to the home WiFi and GPS shows that the user is located at the home. The user's phone may also manage a child's allowance. In terms of NFC, if a home's front door is NFC-enabled, a user can grant access to the housecleaning service and get notified when they attempt access or even require a response from the user's phone to "buzz them in". This can also be used to limit access within the house once a service provider has entered.

Accordingly, the hub key service 114 may also support a hub budget feature provides that a hub member in a hub group can allocate electronic funds to any of the other hub members, or to non-hub members. The hub budget feature can also link with third-party applications to purchase and distribute such things as tickets and gift cards to any of the other hub members in the hub group. The hub budget may be implemented in conjunction with an eWallet application, and can be implemented for vacation shopping, pre-paid passes, gift cards, and to keep track of electronic receipts. In embodiments, the hub budget feature can be implemented as part of the hub user interface, with a client device application.

Example Procedures

The following discussion describes coordination techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Example techniques 500 and 600 are described with reference to respective FIGS. 5 and 6 in accordance with one or more embodiments of a hub key service. Generally, any of the services, functions, techniques, procedures, components, and modules described herein can be implemented using software, firmware, hardware (e.g., fixed logic circuitry), manual processing, or any combination thereof. A software implementation represents program code that performs specified tasks when executed by a computer processor. The example techniques may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The techniques may also be practiced in a distributed computing environment by multiple computer devices. Further, the features described herein are platform-independent and can be implemented on a variety of computing platforms having a variety of processors.

Figure 5:
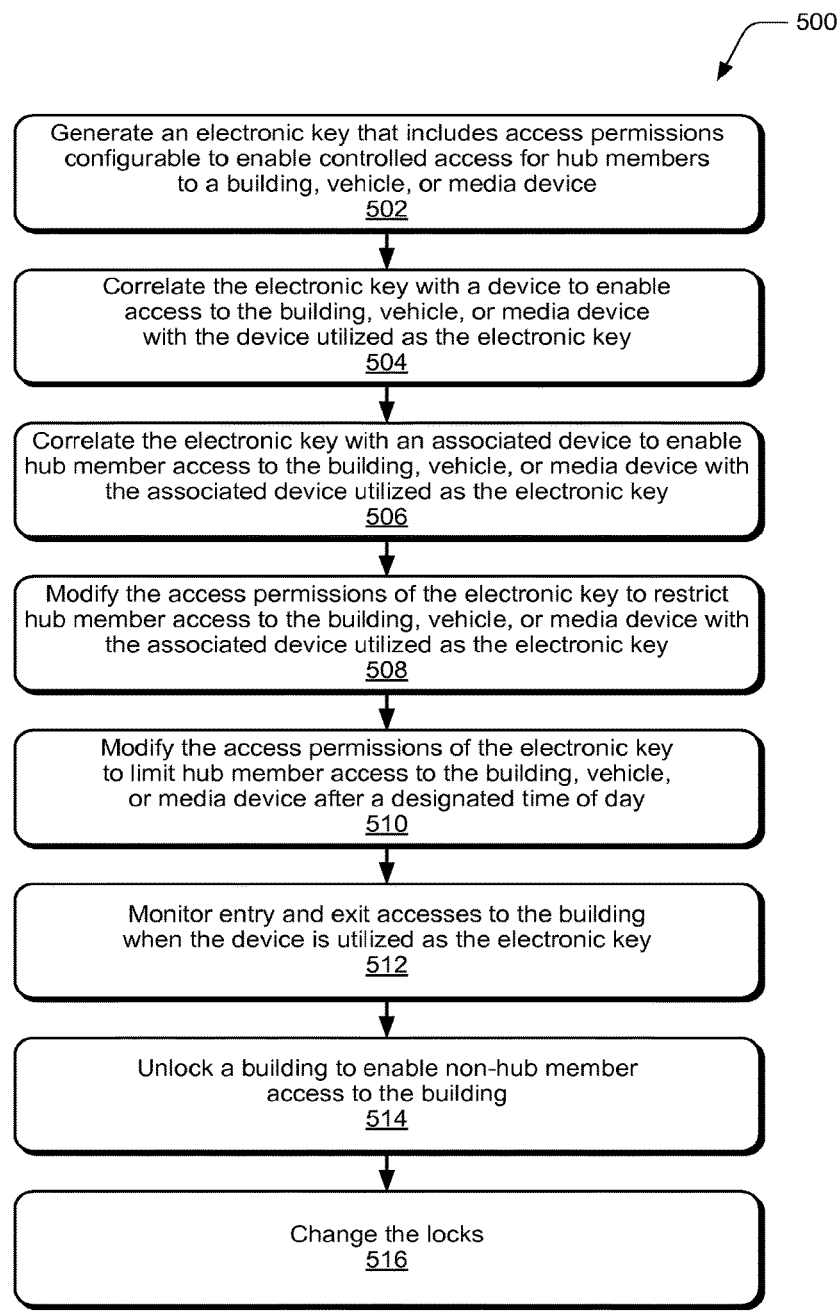
FIG. 5 illustrates example techniques of a hub key service via mobile devices in accordance with one or more embodiments.

FIG. 5 illustrates example technique 500 of a hub key service. The order in which the technique blocks are described are not intended to be construed as a limitation, and any number of the described technique blocks can be combined in any order to implement a technique, or an alternate technique.

At block 502, an electronic key is generated that includes access permissions configurable to enable controlled access for hub members to a building, vehicle, or media device. For example, the hub key service 114 implemented at the client device 102 (FIG. 4) generates an electronic key 302 that includes access permissions 304 to enable controlled access for hub members to a building, vehicle, or media device. An electronic key 302 can be generated for controlled access to any type of building, home, vehicle, media device or location (e.g., television, computer, television channels, on-line content store, etc.) or any other type of access controlled location or device.

At block 504, the electronic key is correlated with a device to enable access to the building, vehicle, or media device with the device utilized as the electronic key. For example, the hub key service 114 correlates the electronic key 302 with the client device 102 to enable access to the building, vehicle, or media device with the mobile device utilized as the electronic key. The mobile device can be utilized as an access identity 412 that is associated with the electronic key for controlled access.

At block 506, the electronic key is correlated with an associated device to enable hub member access to the building, vehicle, or media device with the associated device utilized as the electronic key. For example, the hub key service 114 implemented at the client device 102 correlates the electronic key 302 with an associated device to enable hub member access with the associated device utilized as the electronic key.

At block 508, the access permissions of the electronic key are modified to restrict hub member access to the building, vehicle, or media device with the associated device utilized as the electronic key. For example, the hub key service 114 implemented at the client device 102 modifies the access permissions 304 of the electronic key 302 to restrict hub member access with an associated device utilized as the electronic key.

At block 510, the access permissions of the electronic key are modified to limit hub member access to the building, vehicle, or media device after a designated time of day. For example, the hub key service 114 implemented at the client device 102 modifies the access permissions 304 of the electronic key 302 to limit hub member access after a designated time of day, such as to a building, vehicle, or media device.

At block 512, entry and exit accesses to the building are monitored when the device is utilized as the electronic key. For example, the hub key service 114 implemented at the client device 102 monitors entry and exit accesses to the building when the client device 102 is utilized as the electronic key 302.

At block 514, a building is unlocked to enable non-hub member access to the building. For example, the hub key service 114 implemented at the client device 102 unlocks a building to enable a non-hub member access to the building, such as when a user of the client device 102 initiates unlocking his or her front door to accommodate a delivery or service person access to the residence. This includes receiving the user input at the mobile device to enable the non-hub member access to the building, and communicating the electronic key 302 from the client device 102 to initiate unlocking the building.

At block 516, the locks are changed. For example, the hub key service 114 implemented at the client device 102 changes the locks, which includes changing the electronic key 302 to a different electronic key, such as by generating the different electronic key or altering the current electronic key. This also includes correlating the different electronic key with the client device 102 to enable access to the building, vehicle, or media device with the mobile device utilized as the different electronic key. The different electronic key can also be communicated to associated devices to replace the electronic key for the hub members.

Figure 6:
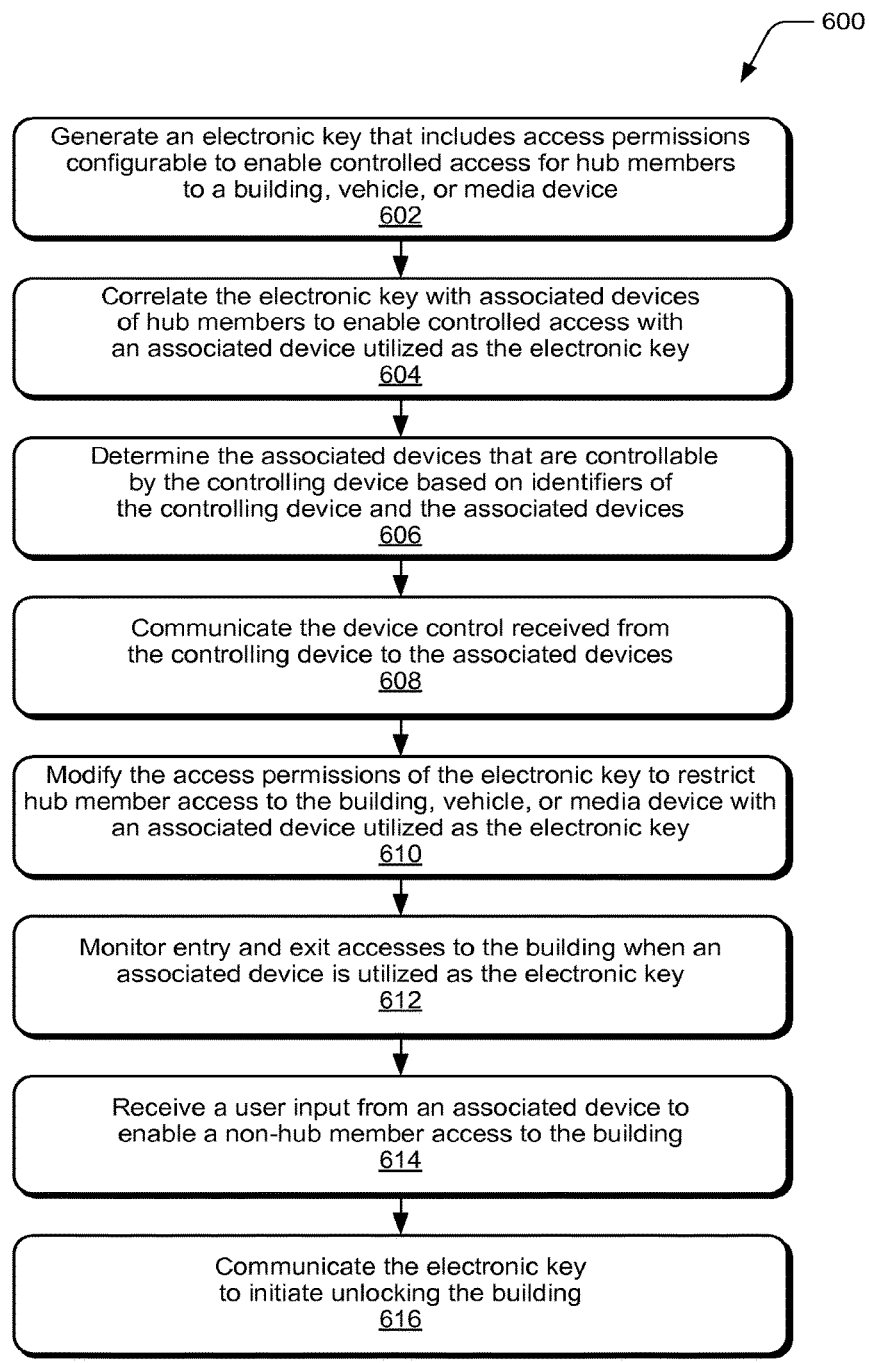
FIG. 6 illustrates example techniques of hub keys via mobile devices in accordance with one or more embodiments.

FIG. 6 illustrates example technique(s) 600 of a hub key service. The order in which the technique blocks are described are not intended to be construed as a limitation, and any number of the described technique blocks can be combined in any order to implement a technique, or an alternate technique.

At block 602, an electronic key is generated that includes access permissions configurable to enable controlled access for hub members to a building, vehicle, or media device. For example, the hub key service 114 implemented as part of the platform 408 (FIG. 4) generates an electronic key that includes access permissions to enable controlled access for hub members to a building, vehicle, or media device.

At block 604, the electronic key is correlated with associated devices of hub members to enable controlled access with an associated device utilized as the electronic key. For example, the hub key service 114 implemented as part of the platform 408 correlates the electronic key with the associated devices (e.g., the mobile devices 402 and 404) of hub members to enable controlled access to a building, vehicle, or media device with an associated device utilized as the electronic key.

At block 606, the associated devices are determined based on identifiers of the associated devices. For example, the hub key service 114 at the platform 408 determines the associated devices, such as the mobile devices 402 and 404, based on the associated devices identifiers 410. At block 608, the electronic key is communicated to the associated devices of the hub members. For example, the hub key service 114 at the platform 408 communicates the electronic key to the associated mobile devices 402 and 404.

At block 610, the access permissions of the electronic key are modified to restrict hub member access to the building, vehicle, or media device with an associated device utilized as the electronic key. For example, the hub key service 114 at the platform 408 modifies the access permissions of the electronic key to restrict hub members access to the building, vehicle, or media device with the associated mobile devices 402 and 404 utilized as the electronic key. The access permissions of the electronic key can also be modified to restrict hub members access after a designated time of day.

At block 612, entry and exit accesses to the building are monitored when an associated device is utilized as the electronic key. For example, the hub key service 114 at the platform 408 monitors entry and exit accesses to the building when the associated mobile devices 402 and 404 are utilized as the electronic key.

At block 614, a user input is received from an associated device to enable a non-hub member access to the building. For example, the hub key service 114 at the platform 408 receives a user input from an associated device (e.g., one of the mobile devices 402 and 404) to enable a non-hub member access to a building. At block 616, the electronic key is communicated to initiate unlocking the building. For example, the hub key service 114 at the platform 408 communicates the electronic key to initiate unlocking the building, such as by communicating the electronic key to a device associated with the non-hub member, or to a receiving device at the building that controls on-site building access.

Implementation Example

Figure 7:
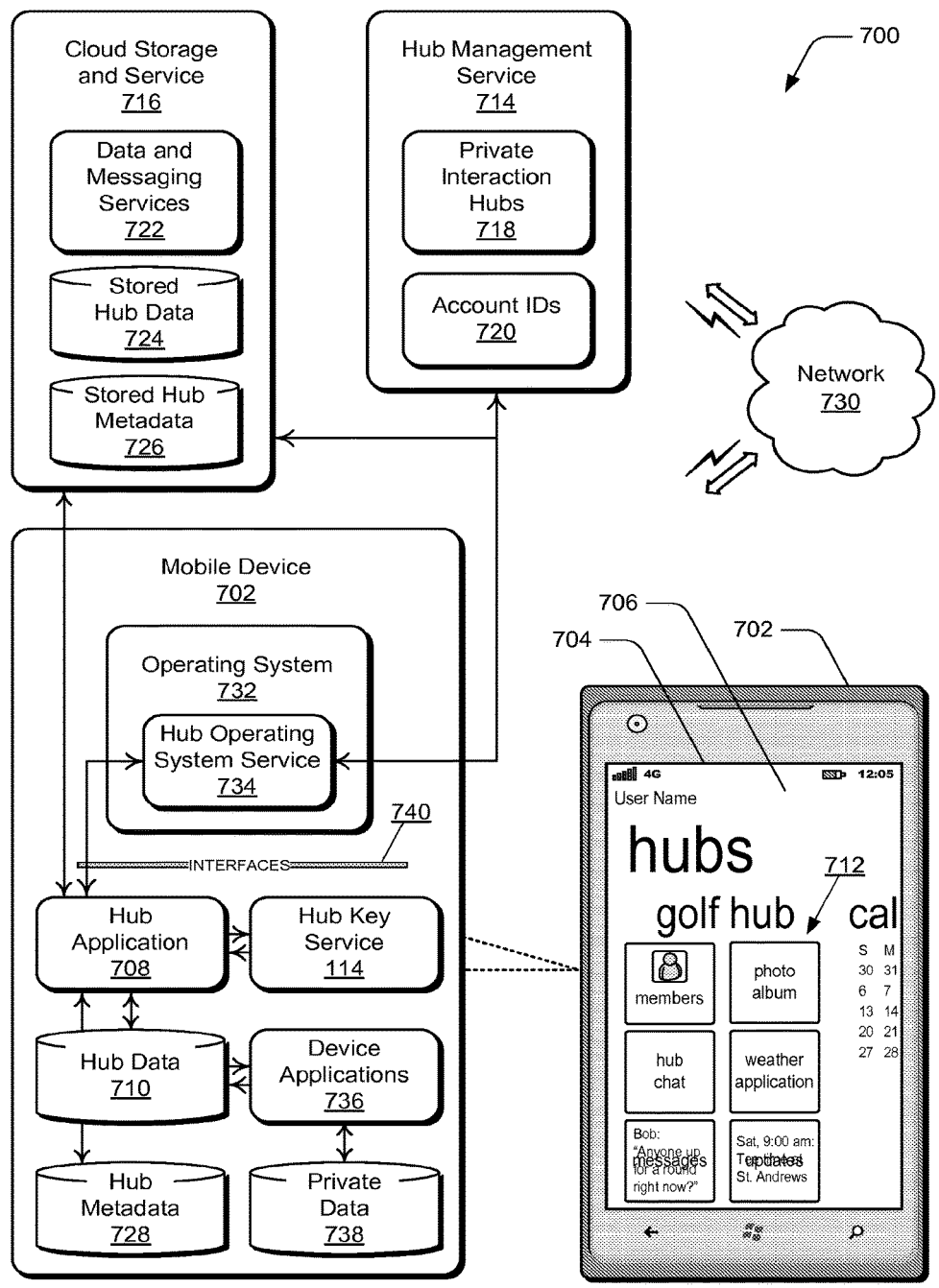
FIG. 7 illustrates an example system in which embodiments of hubs can be implemented.

FIG. 7 illustrates an example system 700 in which embodiments of hubs can be implemented. The system 700 includes an example mobile device 702, which may be any one or combination of a wired or wireless device, such as a mobile phone, tablet, computing, communication, entertainment, gaming, media playback, and/or other type of device. Further, the mobile device 702 may be an example of one or more of the client devices as previously described. Any of the devices can be implemented with various components, such as a processing system and memory, as well as any number and combination of differing components as further described with reference to the example device shown in FIGS. 8, 9, and 10. As such, the mobile device 702 may implement techniques previously described in whole in or part, such as the techniques described in relation to the hub key service 114.

The mobile device 702 includes an integrated display device 704 on which user interfaces can be displayed, such as a hub user interface 706 of a hub application 708. The hub user interface offers a unified interactive view of the hub data 710 for a single, private interaction hub and the hub application 708 aggregates disparate types of the hub data 710 originating from the various member users of the private interaction hub. For example, the hub user interface may provide a single unified access point to shared hub messages, status updates, check-ins, hub calendar events, hub media, hub applications, and other types of hub content. As described above, a private interaction hub (or simply "hub") is a private network or association of member users who voluntarily elect to privately interact and collaborate with each other in a bi-directional manner. The hub data 710 includes any shared data or metadata that is used to facilitate the interaction and collaboration between the members of a private interaction hub, and may include shared data for messaging, notes, contact management, documents, tasks, location updates, photos, calendar events, applications (to include collaborative gaming applications), and/or other media content, such as any type of audio, music, video, and/or image data that may be available or accessed from any source.

The basic functionality of an example private interaction hub is shown as a golf hub displayed in the hub user interface 706 of the hub application 708. For example, the hub user interface can include various selectable user interface tiles 712, such as a members tile that is selectable to initiate a display of the constituent members of the private interaction hub. The user interface tiles 712 may also include hub chat and/or messages tiles to allow a hub member to participate in shared messaging threads with the other member users of the hub. For example, as shown, the member "Bob" has asked "Anyone up for a round right now?" The user interface tiles 712 may also include a photo album tile that is selectable to view photos shared by any of the hub members with the hub, and a shared notebook tile from which the hub members can view shared notes. For example, the golf hub may include a shared notes document that compiles the hub members' collective research of new golf equipment. The hub user interface 706 may also display a shared calendar that allows a member of the hub to view, edit, and post calendar events that will be shared with all of the other hub members. For example, the calendar tile shows an upcoming tee time at St. Andrews on Saturday at 9:00 a.m. for all of the members. When a user selects a group item (e.g., the message from Bob) or tile (e.g., the messaging tile), further details about the selected item or group items related to the selected tile may be displayed by the hub application itself or the hub application may call a different device application 736 (e.g., a messaging application) to display further details about the item(s).

When a user selects or otherwise engages with a piece of displayed hub data, such as the golf message from Bob, the hub application may provide additional details or options to the user to permit the user to interact further with the hub data. For example, the hub application may display controls to allow the user to edit or reply to Bob's message. Alternatively or in addition, when a user selects or otherwise engages with a piece of displayed hub data (e.g., Bob's message), the hub application may launch or call another device application to permit the user to further interact with the piece of hub data (e.g., the hub application may call a native messaging application).

The hub user interface 706 of the hub application 708 can also include user-selectable access to third-party applications, such as when an application is "pinned" to, or otherwise shared with a private interaction hub. A pinned third-party application may also utilize the shared hub data, such as shared application preferences or shared application state data. For example, the golf hub shown displayed in the hub user interface 706 includes a live tile representing a third-party weather application that the members of the hub can quickly access to check the weather forecast at their local golf club, such as when planning an upcoming golf outing. A user of the mobile device 702 can also customize display aspects of a hub user interface, such as the content of the user interface and how the elements of the hub user interface are arranged. Another example of a hub user interface of the hub application 708 is a panoramic hub user interface, such as for a family-centric private interaction hub as shown and described in greater detail with reference to FIG. 9.

The example system 700 also includes a hub management service 714, and a cloud storage and service 716. The hub management service 714 manages the formation and maintenance of private interaction hubs 718. The hub management service can correlate or associate member users of a hub by associating account identifiers 720 of the members with one or more of the private interaction hubs. The account identifier 720 of a member user may be associated with an identifier of a private interaction hub 718 in a data table that the hub management service maintains to correlate the hub members with one or more of the private interaction hubs. The hub management service 714 may also associate devices that correspond to hub members based on device identifiers. The account identifiers 720 can include user membership identifiers and/or sign-on credentials, such as an email and password combination, or a username and password combination. The sign-on credentials may be single sign-on ("SSO") credentials that are utilized for authentication purposes at a number of Web services, including the cloud storage and service 716.

The cloud storage and service 716 can include any type of cloud-based (e.g., network-based) data and messaging services 722. The messaging services may include any type of email, text (e.g., SMS, MMS), and/or instant messaging services. The data services may include any type of calendar, photo album, file or document sharing, location, mapping, music sharing, video sharing, gaming, contacts management, and/or notebook services, as well as any other type of services that can be used to share stored hub data 724. The stored hub data can include any form of messages, updates, events, content, media, and information that is maintained for the private interaction hubs 718, and is accessible from the mobile device 702, either upon a request from a device and/or upon a data "push" to the device. The cloud storage and service 716 also maintains stored hub metadata 726 that includes settings and information pertaining to the private interaction hubs 718, such as the name of a hub, the background image or photo of the hub, and an association of the hub members.

Although shown together as data and messaging services 722, various application data services and various messaging services may be operated on separate devices and/or operated by separate, distinct entities. Additionally, although the hub management service 714 and the cloud storage and service 716 are shown as independent services, they may be implemented together as a single service. Further, a server device (or group of server devices) can include implementations of both the hub management service 714 and the cloud storage and service 716, representative of a single entity that may be the same server system, company system, domain, and the like.

The cloud storage and service 716, and its constituent data and messaging services 722, interchange the stored hub data 724 and the stored hub metadata 726 between the mobile devices that are associated with member users of a private interaction hub 718. For example, a data and/or messaging service of the cloud storage and service 716 can receive a copy of hub data 710 and/or hub metadata 728 from the mobile device 702 that is used by a hub member, store this hub data and hub metadata in the cloud storage as the respective stored hub data 724 and stored hub metadata 726, and then distribute the stored hub data and stored hub metadata to other mobile devices associated with other member users of the same private interaction hub, as well as to other mobile devices associated with the same hub member. The stored hub metadata 726 can include membership information pertaining to the member users of a private interaction hub, hub identifiers that correlate a piece of hub data to a particular private interaction hub, user identifiers that correlate a piece of hub data to a particular member user, modification dates, and/or other metadata.

The cloud storage and service 716, and its constituent data and messaging services 722, may utilize single sign-on ("SSO") credentials for authentication purposes to limit the dissemination of the stored hub data 724 and the stored hub metadata 726 to only the authorized devices of hub members. Additionally, any of the devices and services (e.g., implemented as server devices) described herein can communicate via a network 730, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider. Alternatively or in addition, peer-to-peer communication techniques may be utilized, such as multiple devices connected using a peer-to-peer communication network.

The mobile device 702 includes an operating system 732 of the device, and the operating system includes a hub operating system service 734 that is implemented to integrate cloud-based services, a hub application 708, and local device applications 736 with the operating system to implement aspects of the private interaction hubs 718. The aspects that may be implemented include hub formation and membership maintenance, synchronizing the hub data 710 on the mobile device with the stored hub data 724, and the hub metadata 728 with the stored hub metadata 726, with the cloud storage and service 716, and providing the hub application 708 and the local device applications 736 on the mobile device 702 with access to the hub data 710 and the hub metadata 728. For example, the hub operating system service 734 may directly access the stored hub metadata 726 at the cloud storage and service 716.

The hub operating system service 734 (or alternatively, the hub application 708) may also determine and maintain a local copy of the membership associations of member users account identifiers 720 and identifiers of the private interaction hubs. The hub operating system service 734 may also synchronize the stored hub data 724 from the cloud storage and service 716 with the hub data 710 at the mobile device 702, and synchronize the stored hub metadata 726 from the cloud storage and service with the hub metadata 728 at the mobile device. The hub operating system service 734 may also synchronize with the cloud storage and service 716 (e.g., by sending changes or additions to hub data 710 and hub metadata 728 to the cloud storage and service 716). Such data synchronizations may occur in response to a user launching the hub application.

The mobile device 702 includes the device applications 736 that permit a user of the mobile device to access, create, and/or modify the hub data 710, private data 738 of the user, as well as the stored hub data 624 that is managed by any of the data and messaging services 722 at the cloud storage and service 716. Some or all of the device applications 736 may be implemented as client-side components or modules of any of the data and messaging services 722, or may be implemented as standalone, native applications (e.g., local device applications) at the mobile device. The device applications 736 typically each consume and provide access to only a portion or subset of the hub data 710 and the private data 738, such as only a single type of hub data and private data (e.g., only messaging data, but not calendar data). The device applications also typically present the consumed hub data to a user in conjunction with the private data 738. Private data is data or metadata that is not associated with a private interaction hub and that has not been shared with other members of the hub (e.g., data that has not been shared via the cloud storage and service 716).

The device applications 736 at the mobile device 702 may include a native or third-party messaging application that provides a user with messaging alerts and access to messaging threads. The messaging application provides access to both shared message threads shared with a private interaction hub and private message threads between a user of the mobile device and others who are not members of the hub. The messaging application also allows a user to send a message to all of the hub members without accessing a hub user interface of the hub application. The messaging application may not provide user access to other types of the hub data 710, other than the hub messages. For example, the messaging application may not provide access to the shared calendar events or shared photo albums of the hub.

The device applications 736 may also include a native or third-party calendaring application that provides scheduling alerts and access to a visual calendar. The calendaring application provides user access to both shared calendar events that are shared with hub members, and private calendar events (e.g., Exchange calendar events) that have not been shared with other members of the hub. The calendaring application also allows a user to create and/or share a calendar event to all members of the hub without accessing a hub user interface of the hub application. The application may not provide user access to other types of the hub data 710, other than the hub calendar events. For example, the calendaring application may not provide access to the shared message threads or shared photo albums of the hub.

The device applications 736 may also include a native or third-party media viewing and/or editing application that provides access to photo albums of digital photos or other digital media. The media application provides user access to both shared media files (e.g., photos, videos, and/or music) shared with a private interaction hub, and private media files that have not been shared with other members of the hub. The media application also allows a user to share media files with all members of the hub without accessing a hub user interface of the hub application. The media application may not provide user access to other types of hub data 710, other than hub media files. For example, the media application may not provide access to the shared message threads or shared calendar events of the hub.

The hub operating system service 734 can expose one or more Application Programming Interfaces ("APIs"), application binary interfaces, and/or other types of interfaces 740 to the hub application 708 and to the device applications 736 on the mobile device 702 to allow these applications to access, generate, and/or modify the hub data 710 and/or the hub metadata 728, as described herein. The hub operating system service 734 can be implemented as an integrated software component or module of the operating system 732. The hub operating system service can be maintained at the mobile device 702 as executable instructions that are stored on computer-readable storage media, such as any suitable memory device or electronic data storage as described with reference to the example device shown in FIG. 11. Additionally, the hub operating system service can be executed with a processing system at the mobile device to implement aspects of private interaction hubs.

In embodiments, the hub operating system service 734 can initiate the hub management service 714 to provision a private interaction hub 718. A user of the mobile device 702 can start a private interaction hub 718 and also invite others to join an existing private interaction hub. For example, the hub user interface 706 of the hub application 708 may provide an existing hub member with the option to add a new member to the hub, and the user may identify the prospective member by providing either a mobile device number, or by selecting an existing contact from one of their social networks or other contacts.

The hub operating system service 734 can receive the request from an existing member user of the device and, in response, the hub operating system service 734 and/or the hub management service 714 communicates an invitation to join the hub as an SMS, MMS, or instant message sent to the prospective member's mobile device that may include a link to a registration site or other registration instructions. The hub operating system service 734 and/or the hub management service 714 receives (e.g., via a registration website) an acceptance to the invitation to join the private interaction hub that includes at least an account identifier (such as an SSO credential), and associates the new member with the existing hub at the hub management service 714. Updated membership information, including the new member's account identifier 720 may also be propagated to other mobile devices of other members in the private interaction hub from the hub management service 714. When the new member user joins the hub, he or she may be prompted to download and/or install various applications configured to provide access to the stored hub data 724 and the stored hub metadata 726, such as the hub application 708 and/or the any of the device applications 736. The hub application 708 may also be the entry point by which a user creates a new hub and/or modifies the membership of an existing hub.

A private interaction hub 718 can be provisioned for any association of people, such as family members, coworkers, friends, neighbors, and any other people that may be associated together in a hub. Additionally, a member user of one private interaction hub may also be a member of multiple hubs, which can be based on a single member sign-on that identifies the member to the hub operating system service 734 and/or to the hub management service 714. For example, a person may be a member of a family hub that associates members of the person's family, as well as a member of a neighborhood hub that associates members of the person's neighborhood, and a golf hub that associates the person's friends that often golf together.

The integration of the hub application 708 with the operating system 732 of the mobile device provides that a user of the device can view a message or update on the hub user interface 706 and in an application user interface of an application that is associated with the message or the update. For example, a hub calendar is integrated with the calendar application (e.g., a device application 736) on the mobile device 702, and a calendar update that is displayed in the hub user interface 706 can be selected by the user to initiate the update being displayed in a calendar user interface of the calendar application. Alternatively, the user may view the calendar user interface and select a calendar event that is associated with a private interaction hub to initiate a display of the hub calendar, which includes the calendar event for the members of the hub. As another example, a hub calendar event can be displayed in a hub user interface, and the device calendar application can access and display the hub calendar event along with any private data calendar events that only the user of the device has access to view in a user interface of the device calendar application. The hub application 708 and the device application 736 both acquire the same hub calendar event data (e.g., the same hub data 710 stored on the mobile device). The two different user interfaces (e.g., a hub user interface and a device application user interface) display the same calendar event data.

In another example, the hub messages and chat features are integrated with messaging applications (e.g., the device applications 736) on the mobile device 702, and an email, text, or instant message that is displayed in the hub user interface 706 can be selected by the user of the mobile device 702 to initiate the message being displayed in a messaging application user interface. Alternatively, the user may view a recent message from a member of a private interaction hub in a messaging application user interface, and select the message to initiate a display of the hub messages interface, such as to view the discussion thread associated with the recent message.

In embodiments, the hub operating system service 734 at the mobile device 702 can receive social network updates for the member users of a private interaction hub 718, such as when two or more of the members of a hub are also "friends" on a public social network site, such as (e.g., FACEBOOK®, TWITTER®, or LINKEDIN®). The social network updates can be pulled from a social network site based on the established association of the account identifiers 720 of the hub members of a private interaction hub 718 at the hub management service 714. The hub operating system service 734 can then aggregate the social network updates for a particular hub for display in the hub user interface 706 or on a homepage "live tile" associated with the hub. The hub operating system service 734 at the mobile device 702 can also be implemented to coordinate multi-user interactive updates to an event that is managed in a private interaction hub. For example, several members of a hub may participate in a multi-player interactive game, and each successive interactive update from a member of the hub is initiated by the member at a respective associated mobile device.

Figure 8:
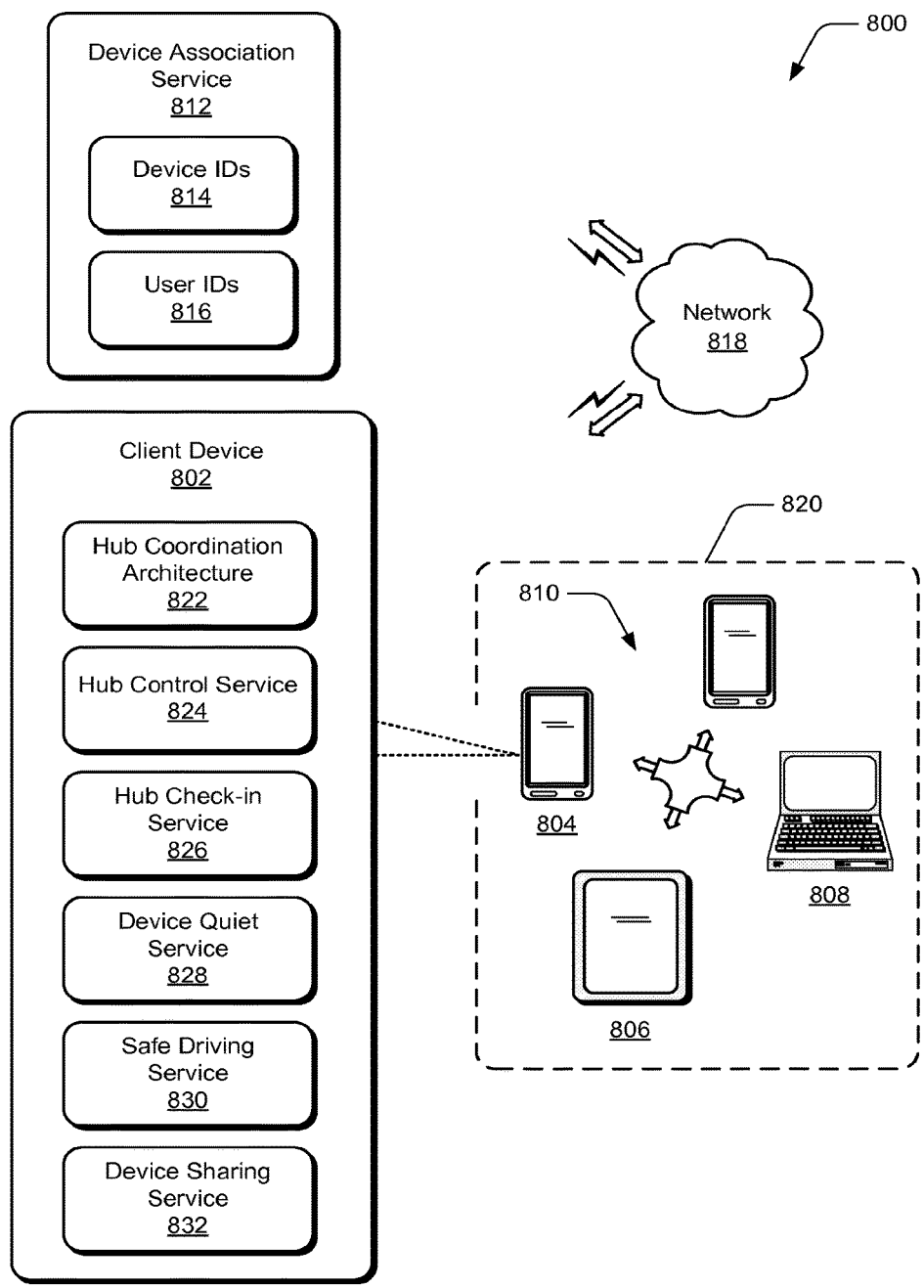
FIG. 8 illustrates another example system in which various embodiments of the previously described techniques can be implemented.

FIG. 8 illustrates an example system 800 in which various embodiments of the previously described techniques can be implemented. The example system includes a client device 802, which may be any one or combination of a mobile phone 804, tablet device 806, computing device 808, communication, entertainment, gaming, navigation, and/or other type of portable electronic device as previously described. Any of the client devices 810 can be implemented with various components, such as a processor and/or memory system, as well as any number and combination of differing components as further described with reference to the example device shown in FIG. 10 to implement embodiments of the techniques described herein.

The example system 800 includes a device association service 812 that associates or correlates the client devices 810 by device identifiers 814, user identifiers 816, and/or by any other type of identifiable association. Any of the devices and services can communicate via a network 818, which can be implemented to include wired and/or wireless networks. The network can also be implemented using any type of network topology and/or communication protocol, and can be represented or otherwise implemented as a combination of two or more networks, to include IP-based networks and/or the Internet. The network may also include mobile operator networks that are managed by mobile operators, such as a communication service provider, cell-phone provider, and/or Internet service provider. A mobile operator can facilitate mobile data and/or voice communication for any type of a wireless device or mobile phone.

The client devices 810 can each be associated with a different user, and the users are defined members of a hub 820. The example client device 802 is representative of the various client devices 810 in the hub. Any of the client devices in the family can include services, such as software applications (e.g., computer-executable instructions), that can be executed by a processor or processor system to implement the embodiments described herein. In this example, the client device 802 includes a hub coordination architecture 822 that implements features of a hub; a hub control service 824 that implements features of a hub dashboard; a hub check-in service 826; a device quiet service 828 that implements features of quiet time and quiet zone; a safe driving service 830; and a device sharing service 832.

Additionally, any one or combination of the various client device services may be abstracted for implementation by a network service provider, such as the device association service 812. For example, the client devices 810 that are associated in the hub 820 can be interconnected through a central computing device or system (e.g., may be one of the client devices 810), which may be local to the multiple devices or may be located remotely from the devices. In embodiments, the central computing device may be a cloud service of one or more server computers that are connected to the multiple devices via the communication network 818 or other communication link. The interconnection architecture enables functionality across multiple devices to provide a common and seamless experience to a user of the multiple devices. Each of the client devices may have different physical configurations and capabilities, and the central computing device implements a platform to enable delivery of an experience that is both tailored to a particular device and yet common to all of the devices.

Figure 9:
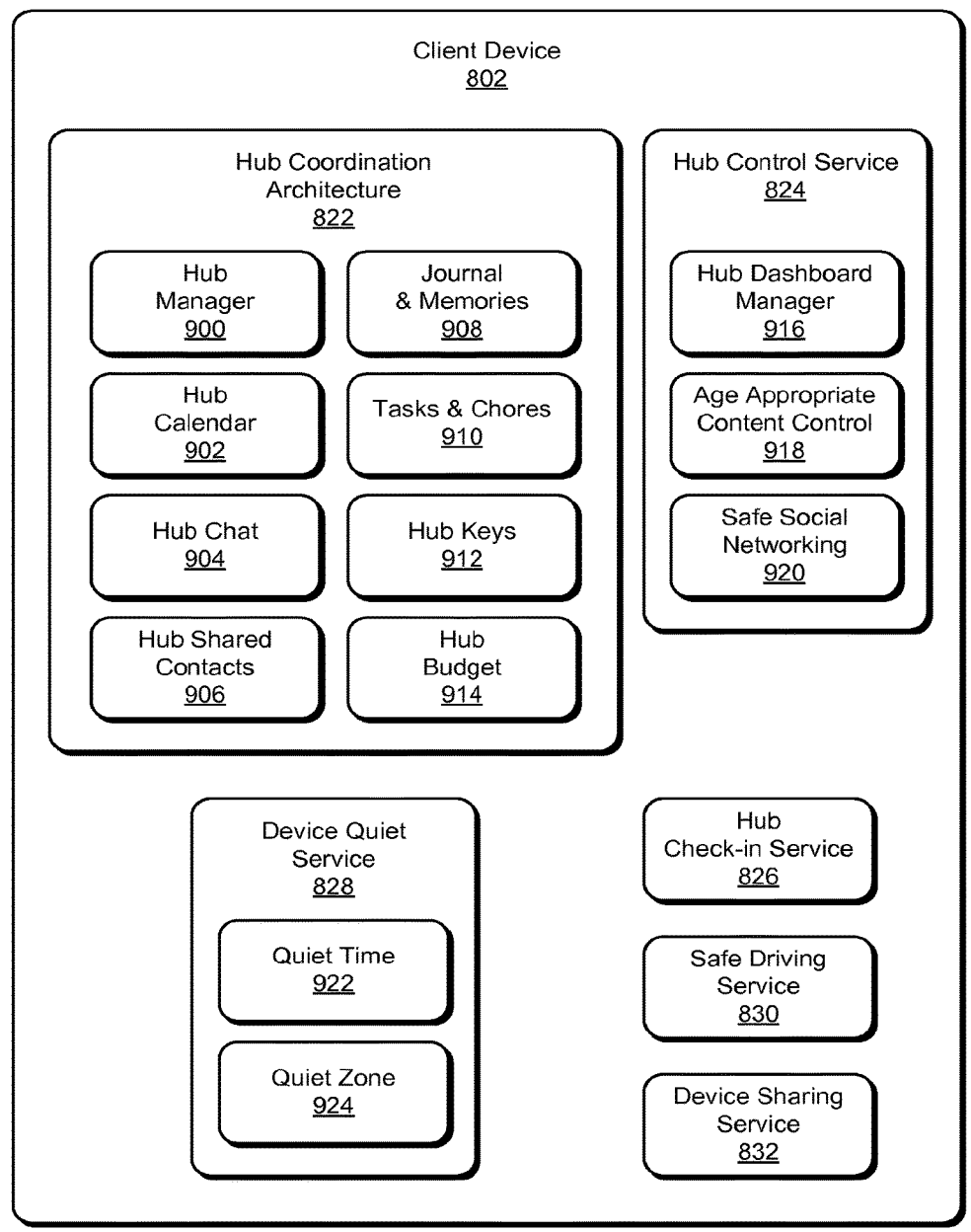
FIG. 9 further illustrates the various client device services that are described with reference to the previous sections.

FIG. 9 further illustrates the various client device services that are described with reference to the previous sections. The client device 802 includes the hub coordination architecture 822, the hub control service 824, the hub check-in service 826, the device quiet service 828, the safe driving service 830, and the device sharing service 832. In embodiments, the hub coordination architecture 822 may generally be implemented as a service, as described herein. Generally, any of the described services may be implemented and/or described in the general context of software, firmware, hardware (e.g., fixed logic circuitry), manual processing, applications, routines, programs, objects, components, data structures, procedures, modules, functions, or any combination thereof. A software implementation represents program code that performs specified tasks when executed by a computer processor. In embodiments, any of the processing, computation, filtering, code execution, etc. can be implemented with distributed computing services and/or devices, such as on a client device, a server device, and/or network-based service.

In this example of the client device services, the hub coordination architecture 822 includes a hub manager 900 that implements, coordinates, and/or manages various hub features, such as hub calendar 902, hub chat 904, hub shared contacts 906, hub journal and memories 908, tasks and chores 910, hub keys 912, and hub budget 914. The hub control service 824 implements features such as a hub dashboard manager 916, age appropriate content control 918, and safe social networking 920. The device quiet service 828 implements features such as quiet time 922 and quiet zone 924. The various client device services and features are further described throughout the document.

Any of the client device services can include, be integrated with, or implement any of the other client device services and applications. For example, the hub coordination architecture 822 can include any one or combination of the hub control service 824, the hub check-in service 826, the device quiet service 828, the safe driving service 830, and the device sharing service 832. In embodiments, the hub coordination architecture 822 may be implemented for the coordination of time, messaging, data, activities, and any other shared services. The shared services may be any of the client device services and/or any type of shared services that may be associated with a service and/or multi-system operator (MSO) devices. Further, the hub control service 824 can be implemented to throttle, expand, manage, and/or reallocate data sharing of the client device services. Any of the hub features and/or applications of the hub coordination architecture can be implemented as private, some private and some public, or private with optional user control to share information and data with public third-party services and applications. Similarly, any of the client device services and applications described herein may be private, public, sharable, user-controllable, and/or any combination thereof.

Figure 10:
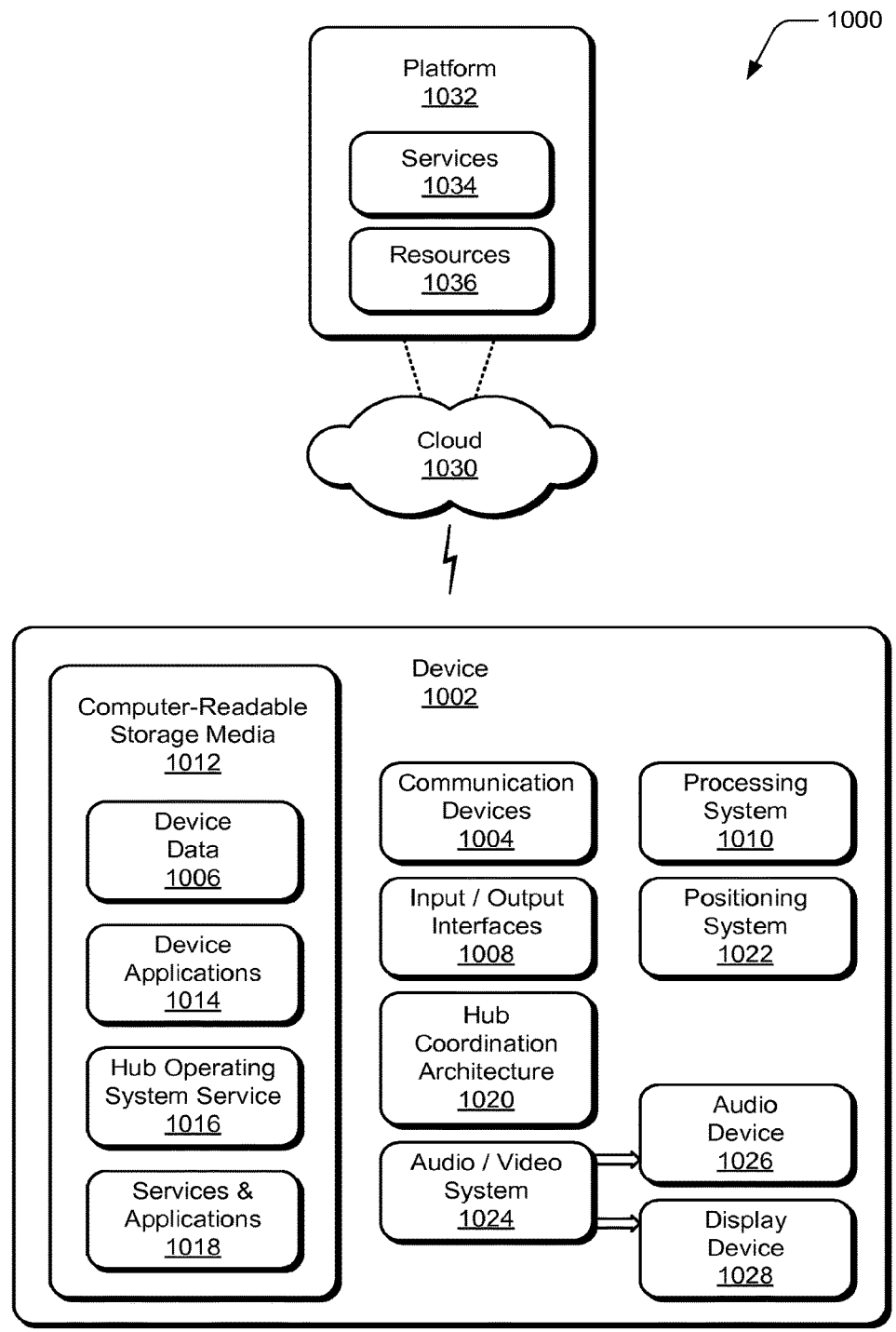
FIG. 10 illustrates an example system that includes an example device, which can implement embodiments of private interaction hubs.

FIG. 10 illustrates an example system 1000 that includes an example device 1002, which can implement embodiments of private interaction hubs. The example device 1002 can be implemented as any of the devices, services, and/or servers previously described, such as any type of client or mobile device (e.g., mobile phone, tablet, computing, communication, entertainment, gaming, media playback, and/or other type of device). For example, the mobile device 702, hub key service 114, and/or cloud service and storage 716 shown in FIG. 7 may be implemented as the example device 1002.

The device 1002 includes communication devices 1004 that enable wired and/or wireless communication of device data 1006, such as media content and the shared messages, updates, and events data at the device. The media content can include any type of audio, video, and/or image data. The communication devices 1004 can also include transceivers for cellular phone communication and/or for network data communication.

The device 1002 also includes input/output (I/O) interfaces 1008, such as data network interfaces that provide connection and/or communication links between the device, data networks, and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The I/O interfaces 1008 also support natural user interface (NUI) inputs to the device 1002, such as any interface technology that enables a user to interact with a device in a "natural" manner, free from artificial constraints imposed by input devices such as mice, keyboards, remote controls, and the like. Examples of natural user interface inputs may rely on speech recognition, touch and stylus recognition, gesture recognition on-screen and motion gesture recognition proximate the device, head, eye, and environment recognition and tracking, augmented reality and virtual reality systems, and any other type of audible, vision, touch, gesture, and/or machine intelligence that may determine user input intentions.

The device 1002 includes a processing system 1010 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1002 may further include any type of a system bus or other data and command transfer system that couples the various components within the device. A system bus can include any one or combination of different bus structures and architectures, as well as control and data lines.

The device 1002 also includes computer-readable storage media 1012, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

Generally, computer-readable storage media is representative of media and/or devices that enable persistent and/or non-transitory storage of data in contrast to mere signal transmission, carrier waves, or signals per se. A computer-readable signal media may refer to a signal-bearing medium that transmits instructions, such as via a network. The signal media can embody computer-readable instructions as data in a modulated data signal, such as carrier waves or other transport mechanism.

The computer-readable storage media 1012 provides storage of the device data 1006 and various device applications 1014, such as an operating system that is maintained as a software application with the computer-readable storage media and executed by the processing system 1010. In this example, the device applications also include an hub operating system service 1016 that implements embodiments of private interaction hubs, such as when the example device 1002 is implemented as the client device 702 shown in FIG. 7. An example of the hub operating system service 1016 is the hub operating system service 724 that is integrated with the operating system 722 at the mobile device 702, as described with reference to FIG. 7.

The device applications 1014 can also include any of the hub services and applications 1018 that implement embodiments of private interaction hubs and/or mobile devices family coordination, such as described with reference to FIGS. 7-9. The example device 1002 also includes a hub coordination architecture 1020, which may be implemented in the general context of software, firmware, hardware (e.g., fixed logic circuitry), or any combination thereof to support embodiments of private interaction hubs and/or mobile devices family coordination. The device 1002 can also include a positioning system 1022, such as a GPS transceiver, or similar positioning system components, that can be utilized to determine a global or navigational position of the device.

The device 1002 also includes an audio and/or video system 1024 that generates audio data for an audio device 1026 and/or generates display data for a display device 1028. The audio device and/or the display device include any devices that process, display, and/or otherwise render audio, video, display, and/or image data. In implementations, the audio device and/or the display device are integrated components of the example device 1002. Alternatively, the audio device and/or the display device are external, peripheral components to the example device.

In embodiments, at least part of the techniques described for private interaction hubs may be implemented in a distributed system, such as over a "cloud" 1030 in a platform 1032. The cloud 1030 includes and/or is representative of the platform 1032 for services 1034 and/or resources 1036. For example, the services 1034 may include the hub management service 708 and the cloud service and storage 710 as described with reference to FIG. 7. Additionally, the resources 1036 may include any of the messaging applications and the collaborative applications as described previously.

The platform 1032 abstracts underlying functionality of hardware, such as server devices (e.g., included in the services 1034) and/or software resources (e.g., included as the resources 1036), and connects the example device 1002 with other devices, servers, etc. The resources 1036 may also include applications and/or data that can be utilized while computer processing is executed on servers that are remote from the example device 1002. Additionally, the services 1034 and/or the resources 1036 may facilitate subscriber network services, such as over the Internet, a cellular network, or Wi-Fi network or any combination of these networks. The platform 1032 may also serve to abstract and scale resources to service a demand for the resources 1036 that are implemented via the platform, such as in an interconnected device embodiment with functionality distributed throughout the system 1000. For example, the functionality may be implemented in part at the example device 1002 as well as via the platform 1032 that abstracts the functionality of the cloud 1030.

Although embodiments of a hub key service for coordinated access have been described in language specific to features and/or methods, the appended claims are not necessarily limited to the specific features or methods described. Rather, the specific features and methods are disclosed as example implementations of a hub key service.

The invention claimed is:

1. A system, comprising:
a processor; and
a computer-readable storage device storing computer-readable instructions which, when executed by the processor, cause the processor to:
provide a sign-on service for a plurality of members of a group, the plurality of members of the group having a plurality of associated identifiers;
obtain, at the sign-on service, authentication credentials from an individual mobile computing device;
responsive to obtaining the authentication credentials at the sign-on service, attempt to authenticate the individual mobile computing device or an individual user of the individual mobile computing device; and
in at least one instance when the individual mobile computing device or the individual user is authenticated and the individual mobile computing device or the individual user has an individual identifier indicating membership in the group, enable the individual mobile computing device to unlock a physical lock by configuring an electronic key to unlock the physical lock and distributing the electronic key to the individual mobile computing device over a network.

2. The system of claim 1, embodied as a cloud server device.

3. The system of claim 1, wherein the physical lock secures a vehicle or a building.

4. The system of claim 1, wherein the group is a data-sharing group that shares private data within the group.

5. The system of claim 4, wherein the computer-readable instructions, when executed by the processor, cause the processor to:
synchronize at least some of the private data with other mobile computing devices associated with the group.

6. The system of claim 1, wherein the authentication credentials comprise a user identifier and a password.

7. The system of claim 6, wherein the individual identifier indicating membership in the group comprises the user identifier.

8. A computing device, comprising:
a processor; and
a computer-readable storage device storing computer-readable instructions which, when executed by the processor, cause the processor to:
send authentication credentials over a network to a remote sign-on service, the remote sign-on service using the authentication credentials to authenticate the computing device or a user of the computing device to a cloud service, the cloud service establishing the computing device or the user as a member of a group having one or more other members based at least on an identifier of the computing device or the user;
based at least on membership in the group, obtain access permission to unlock a physical lock by obtaining an electronic key over the network from the cloud service; and
after obtaining the access permission, unlock the physical lock by communicating the electronic key received over the network to the physical lock.

9. The computing device of claim 8, wherein the authentication credentials comprise the identifier and a password.

10. The computing device of claim 9, wherein the computer-readable instructions, when executed by the processor, cause the processor to:
employ near-field communication to communicate the electronic key to the physical lock.

11. The computing device of claim 10, wherein the near-field communication is wireless radio frequency communication.

12. The computing device of claim 8, wherein the physical lock controls access to a building, a vehicle, a safe, or a cabinet.

13. The computing device of claim 8, embodied as a mobile device.

14. A method comprising:
provisioning a group of members having associated computing devices;
providing a sign-on service for authentication of individual members of the group;
obtaining, at the sign-on service, authentication credentials from an individual mobile computing device;
responsive to receiving the authentication credentials at the sign-on service, attempting to authenticate the individual mobile computing device or an individual user of the individual mobile computing device; and
in at least one instance when the individual mobile computing device or the individual user is authenticated and the individual mobile computing device or the individual user has an individual identifier indicating membership in the group, enabling the individual mobile computing device to control a physical lock by communicating an electronic key over a network to the individual mobile computing device.

15. The method of claim 14, further comprising:
generating the electronic key and configuring the electronic key with access permissions to control the physical lock.

16. The method of claim 15, further comprising:
after configuring the electronic key with the access permissions, modifying the access permissions of the electronic key to limit use of the electronic key to control the physical lock.

17. The method of claim 16, further comprising:
limiting the use of the electronic key to control the physical lock to a designated time of day.

18. The method of claim 16, further comprising:
limiting the use of the electronic key to control the physical lock to a specific time window.

19. The method of claim 14, further comprising:
monitoring accesses to the physical lock by the individual members of the group.

20. The method of claim 14, further comprising:
providing a private, shared space to the members of the group based at least on membership in the group, the members accessing shared data via the private, shared space.

* * * * *